United States Patent [19]

Sumiyoshi et al.

[11] Patent Number: 5,726,721
[45] Date of Patent: Mar. 10, 1998

[54] LIQUID CRYSTAL DISPLAY APPARATUS

[75] Inventors: Ken Sumiyoshi; Yoriko Hatada, both of Tokyo, Japan

[73] Assignee: NEC Corporation, Tokyo, Japan

[21] Appl. No.: 469,921

[22] Filed: Jun. 6, 1995

[30] Foreign Application Priority Data

Jun. 6, 1994 [JP] Japan .................... 6-123420

[51] Int. Cl.$^6$ .................... G02F 1/1333; G02F 1/141; G02F 1/1343
[52] U.S. Cl. .................... 349/54; 349/136; 349/139
[58] Field of Search .................... 349/54, 110, 128, 349/136, 139

[56] References Cited

U.S. PATENT DOCUMENTS

| | | | |
|---|---|---|---|
| 5,249,070 | 9/1993 | Takano | 359/54 |
| 5,280,375 | 1/1994 | Tsuda et al. | 349/128 |
| 5,309,264 | 5/1994 | Lien et al. | 359/87 |
| 5,339,181 | 8/1994 | Kim et al. | 359/59 |
| 5,398,127 | 3/1995 | Kubota et al. | 359/75 |
| 5,598,285 | 1/1997 | Kondo et al. | 349/39 |

*Primary Examiner*—William L. Sikes
*Assistant Examiner*—Charles Miller
*Attorney, Agent, or Firm*—Sughrue, Mion, Zinn, Macpeak & Seas, PLLC

[57] ABSTRACT

In a liquid crystal display apparatus comprising a twisted nematic liquid crystal sandwiched between a first substrate having a common electrode and a second substrate having a plurality of pixel electrodes, the twisted nematic liquid crystal having a splay distortion when no voltage is applied, a scan line is inserted between a pixel electrode and a signal electrode.

10 Claims, 21 Drawing Sheets

STATE L          STATE H

32 ONE PIXEL

32 ONE PIXEL

NO VOLTAGE APPLIED $\alpha 1 > \beta 1$
$\alpha 2 < \beta 2$

VOLTAGE APPLIED

STATE H    STATE L

WHITE DISPLAYED ($V_{WHITE} > V_{TH}$)

5 UPPER GLASS SUBSTRATE $\alpha 1 > \beta 1$
$\alpha 2 < \beta 2$

6 LIQUID CRYSTAL MOLECULE

7 LOWER GLASS SUBSTRATE

SELECTION OF STATE H

BLACK DISPLAYED

5 UPPER GLASS SUBSTRATE

6 LIQUID CRYSTAL MOLECULE

7 LOWER GLASS SUBSTRATE

18 ORIENTATION OF LIQUID CRYSTAL MOLECULE
14 or 15
17 POLYIMIDE FILM

LIQUID CRYSTAL DISPLAY APPARATUS

BACKGROUND OF THE INVENTION

1. Field of the invention

The present invention relates to a liquid crystal display apparatus and a method for driving the same.

2. Description of related art

A liquid crystal display apparatus involves an inherent problem called a "viewing angle dependency", which is attributable to a behavior of liquid crystal molecules when a voltage is applied. Now, this viewing angle dependency will be described with reference to an example of a twisted nematic (TN) mode which is widely used in a TFT (thin film transistor) driven liquid crystal display apparatus.

The liquid crystal molecules are considered to be bar-like molecules. In the TN mode, liquid crystal molecules 6 are sandwiched between two glass substrates as shown in FIG. 1. Namely, the liquid crystal molecules are oriented in parallel not only to an upper glass substrate 5 but also to a lower glass substrate 7. However, the liquid crystal molecules are actually oriented to have a small pre-tilt angle 25 in relation to a glass plate boundary. In addition, in fact, the orientation direction of the liquid crystal molecules at the upper glass substrate surface is substantially normal to the orientation direction of the liquid crystal molecules at the lower glass substrate surface. In FIG. 1, for simplification of the drawing, this twist of 90 degrees of the liquid crystal molecules is not shown for making it easier to see. In this condition, a remarkable viewing angle dependency is not observed.

If an voltage is applied to the TN liquid crystal, the liquid crystal molecules 6 are arranged to become in parallel to an electric field as shown in FIG. 2. At this time, the liquid crystal molecules 6 stand up from the direction of the pre-tilt angle. In FIG. 2, the twist of the liquid crystal molecules is omitted for making it easier to see, similarly to FIG. 1. Birefringence of the liquid crystal molecules is determined by an angle formed between a long axis of the liquid crystal molecules and a light ray. Here, paying attention to molecules of a liquid crystal in a middle of a cross section of a cell, the light ray 27 have a large angle to the long axis of the liquid crystal molecules in the middle of the cross section of the cell, and on the other hand, the light ray 26 has only a small angle to the long axis of the liquid crystal molecules in the middle of the cross section of the cell. Therefore, it would be understood that a change in the line of sight toward a left direction and another change in the line of sight toward a right direction show different optical characteristics. Ordinary liquid crystal display apparatus are so constructed that the horizontal direction in FIG. 2 becomes a vertical direction. Therefore, with a change of a viewing angle in the vertical direction (from an upper position to a lower position or vice versa), it is observed as a negative/positive of a displayed image is inverted. With a change of the viewing angle in another direction, the displayed image whitens so that the contrast lowers.

In order to overcome this problem, U.S. Pat. No. 5,249,070 (which corresponds to Japanese Patent Application Laid-open No. JP-A-4-149410 and the disclosure of which is incorporated by reference in its entirety into this application) proposed a liquid crystal display as shown in FIG. 3, in which the twist of the liquid crystal molecules is omitted for making it easier to see, similarly to FIG. 1. As seen from comparison between FIGS. 1 and 3, in the liquid crystal orientation structure shown in FIG. 3, the pre-tilt angles of the liquid crystal molecules 6 at the upper and lower glass substrates 5 and 7 are not consistent. This liquid crystal orientation structure is said to have a splay distortion because the pre-tilt angle is not in alignment. In this condition, the pre-tilt angle of the liquid crystal molecules in a middle of a cross section of a cell becomes almost zero degree. In this liquid crystal display, a common electrode 8 is formed to continuously cover a whole surface of the upper substrate 5, and each pixel electrode 9 is formed to define one pixel zone on the lower substrate 7.

When a voltage is applied to this liquid crystal display, since the common electrode 8 and the pixel electrode 9 are different in area, disturbance 30 of an electric field occurs at an edge or periphery of the pixel electrode as shown in FIG. 4. As shown in FIG. 4, in a liquid crystal region of a left half of the pixel in the drawing, the liquid crystal molecules in a middle of a cross section of a cell has such an orientation structure that the liquid crystal molecules attempt to stand up from a left side of the molecules, and on the other hand, in a liquid crystal region of a right half of the pixel in the drawing, the liquid crystal molecules in the middle of the cross section of the cell has such an orientation structure that the liquid crystal molecules attempt to stand up from a fight side of the molecules. Namely, one pixel is divided into a domain 28 in which the liquid crystal molecules in the middle of the cross section of the cell attempt to stand up from a left side of the molecules, and another domain 29 in which the liquid crystal molecules in the middle of the cross section of the cell attempt to stand up from a fight side of the molecules. In this situation, if a light ray is inclined to left, an angle between the light ray and the long axis of the liquid crystal molecules in the domain 28 becomes large, on the other hand, an angle between the light ray and the long axis of the liquid crystal molecules in the domain 29 becomes small. To the contrary, if a light my is inclined to right, an angle between the light my and the long axis of the liquid crystal molecules in the domain 28 becomes small, on the other hand, an angle between the light ray and the long axis of the liquid crystal molecules in the domain 29 becomes large. For the inclination of the light ray to left and right, the change of the optical characteristics in one domain in each pixel compensates the change of the optical characteristics in the other domain in the same pixel, so that the image inversion and the whitening can be suppressed.

Furthermore, U.S. Pat. No. 5,309,264 (which corresponds to Japanese Patent Application Laid-open No. JP-A-6-043461 and the disclosure of which is incorporated by reference in its entirety into this application) proposed a liquid crystal display as shown in FIG. 5, in which the twist of the liquid crystal molecules is omitted for making it easier to see, similarly to FIG. 1. When a voltage is applied to this liquid crystal display, the situation is divided into a case in which the liquid crystal molecules in the middle of the cross section of the cell attempt to stand up from a right side of the molecules and in another case in which the liquid crystal molecules in the middle of the cross section of the cell attempt to stand up from a left side of the molecules. In this pixel structure, disturbance 31 of an electric field occurs near to an opening 10 of the common electrode 8, in addition to the disturbance 30 of the electric field occurring at the edge or periphery of the pixel electrode 9, with the result that the liquid crystal orientation structure becomes as shown in FIG. 5. Accordingly, when the voltage is applied, the liquid crystal orientation structure becomes similar to the example shown in FIG. 4, and therefore, the viewing angle dependency is suppressed.

In the above mentioned two conventional pixel structure, the electric field at the edge or periphery of the pixel and the electric field at the opening of the pixel have been required to halve the orientation region when the voltage is applied. In the TFT driven liquid crystal display, however, each pixel electrode is surrounded by scan lines and signal lines. Accordingly, what corresponds to the electric field at the edge or periphery of the pixel, is composed of an electric field between the pixel electrode and the scan line and an electric field between the pixel electrode and the signal line. Of the two electric fields, the electric field between the pixel electrode and the signal line changes dependently upon a displayed image, and therefore, does not become a stable electric field. In other words, a response time of the liquid crystal changes dependently upon the displayed image. It is disadvantageous in that a stable displayed image cannot be obtained, regardless of whether or not the common electrode has the opening.

In the above mentioned two conventional pixel structure, if the pre-tilt angles at the upper and lower substrates are not precisely consistent with each other, the tilt angle of the liquid crystal molecules in the middle of the cross section of the cell never becomes zero. In fact, however, the value of the pre-tilt angles at the upper and lower substrates have a distribution or variation. For example, if the pre-tilt angle at the upper substrate is larger than the pre-tilt angle at the lower substrate, when the voltage is applied, it becomes easy to assume a state H as shown in FIG. 6, so that the pixel is not equally halved, and as shown FIG. 7, in one pixel 32, one domain assuming the state H becomes larger than the other domain. On the other hand, if the pre-tilt angle at the lower substrate is larger than the pre-tilt angle at the upper substrate, when the voltage is applied, it becomes easy to assume a state L as shown in FIG. 6, so that the pixel is not equally halved, and as shown FIG. 8, in one pixel 32, one domain assuming the state L becomes larger than the other domain assuming the state H.

As mentioned above, in the case that the liquid crystal display of the above mentioned pixel structure is actually manufactured, there is almost no case in which the pixel is equally halved when the voltage is applied. This situation similarly occurs not only in the pixel structure shown in FIG. 5 having the opening in the common electrode but also in the pixel structure shown in FIG. 4 having no opening in the common electrode. As a result, it is not possible to obtain a viewing angle/transmittivity characteristics having a symmetry to a horizontal center line.

Furthermore, when the voltage is applied to the above mentioned conventional pixel structure, a long time is required until the shape of the domain becomes stable. The reason for this is as follows: For convenience of explanation, as shown in FIG. 9, the liquid crystal in the inside of the pixel is divided into a liquid crystal portion X near to the edge or periphery of the pixel, a liquid crystal portion Y near to the opening of the common electrode, and a liquid crystal portion Z between the portions X and Y. When the voltage is applied, the liquid crystal portions X and Y assume the state H shown in FIG. 6 as mentioned above in accordance with the direction of the applied electric field. However, since the electric field is substantially perpendicular to the substrates in the liquid crystal portion Z, a region assuming the state H and a region assuming the state L co-exist in the liquid crystal portion Z in a mixed manner. With lapse of time from the application of the voltage, the state H or L in the liquid crystal portions X, Y and Z is merged with the other state or disappears. As a result, a steady condition as shown 5 is reached.

One example of the change of the domains with lapse of time is illustrated in FIG. 10. FIG. 10 shows the change of the domains with lapse of time in the pixel having the opening 10 in the common electrode. At the moment the voltage is applied, the liquid crystal at the edge or periphery of the pixel electrode changes to the state H or the state L, but in an area remote from the edge or periphery of the pixel electrode, the state H and the state L co-exist. With lapse of the time, merger and disappearance of the domains start to occur, and with further lapse of the time, a L domain in a H domain disappears and a H domain in a L domain disappears so that the pixel is put in a steady condition. However, a time TL until the L domain has completely disappeared in the H domain is not necessarily consistent with a time TH until the H domain has completely disappeared in the L domain. When the liquid crystal pixel is observed from a direction normal to the substrate, both of the H domain and the L domain indicate black and therefore cannot be distinguished from each other. However, when the liquid crystal pixel is observed from an inclined direction, the H domain is observed to be light but the L domain is observed to be dark, or vice versa. For example, if TL>TH and if the liquid crystal pixel is observed from an inclined direction, a process of disappearance of the L domain is observed. This process of disappearance of the L domain is recognized to be a change of a light condition to a dark condition or a change of a dark condition to a light condition.

Furthermore, a long time on the order of about one second is required just after application of the voltage until the merger of the domains is completed. When a quickly moving picture is displayed, a phenomenon in which the moving image threads behind, is observed. A similar problem occurs in the pixel structure having no opening in the common electrode as shown in FIG. 4.

In addition, when the above mentioned conventional pixel structure is used in a normally white mode (in which when no voltage is applied, while is displayed, and when a voltage is applied, black is displayed), the following problem has been encountered. When a voltage is applied, the liquid crystal portions X and Z shown in FIG. 9 finally become a steady condition (FIG. 5) so that these portions are put in a black indicating condition. However, the liquid crystal portion Y corresponds to the boundary of the domain, and assumes an orientation condition different from those of the liquid crystal portions X and Z in the black indicating condition. Because of this, the liquid crystal portion Y does not assume the black indicating condition, and therefore, when the black is to be displayed, a light transmittivity increases, with the result that a display image having a high contrast ratio (transmittivity in white indication to transmittivity in black indication) cannot be obtained.

As seen from the above, the above mentioned conventional pixel structure is introduced in a TFT driven liquid crystal display, a uniform display operation cannot be obtained, and a response speed is slow.

SUMMARY OF THE INVENTION

Accordingly, it is an object of the present invention to provide a liquid crystal display apparatus, which has overcome the above mentioned defect of the conventional one.

Another object of the present invention is to provide a liquid crystal display apparatus capable of giving a uniform display and having a quick response.

The above and other objects of the present invention are achieved in accordance with a first aspect of the present invention by a liquid crystal display apparatus comprising a twisted nematic liquid crystal sandwiched between a first substrate having a common electrode and a second substrate having a plurality of pixel electrodes, the twisted nematic liquid crystal having a splay distortion when no voltage is applied, wherein a scan line is inserted between a pixel electrode and a signal electrode.

According to a second aspect of the present invention, there is provided a liquid crystal display apparatus comprising a twisted nematic liquid crystal sandwiched between a first substrate having a common electrode and a second substrate having a plurality of pixel electrodes, the twisted nematic liquid crystal having a splay distortion when no voltage is applied, wherein a pre-tilt angle of the liquid crystal at the first and second substrate is not greater than 1 degree.

According to a third aspect of the present invention, there is provided a liquid crystal display apparatus comprising a twisted nematic liquid crystal sandwiched between a first substrate having a common electrode and a second substrate having a plurality of pixel electrodes, the twisted nematic liquid crystal having a splay distortion when no voltage is applied, wherein them is provided a means for applying a voltage not less than a threshold voltage at the time of displaying.

In the liquid crystal display apparatuses in accordance with the three aspects of the present invention, the common electrode has an opening provided for each of the pixel electrodes, according to a fourth aspect of the present invention. In addition, according to a fifth aspect of the present invention, a light block layer is preferably provided in positional alignment with each opening of the common electrode.

The above and other objects, features and advantages of the present invention will be apparent from the following description of preferred embodiments of the invention with reference to the accompanying drawings.

DESCRIPTION OF THE PREFERRED EMBODIMENTS

Figure 11:
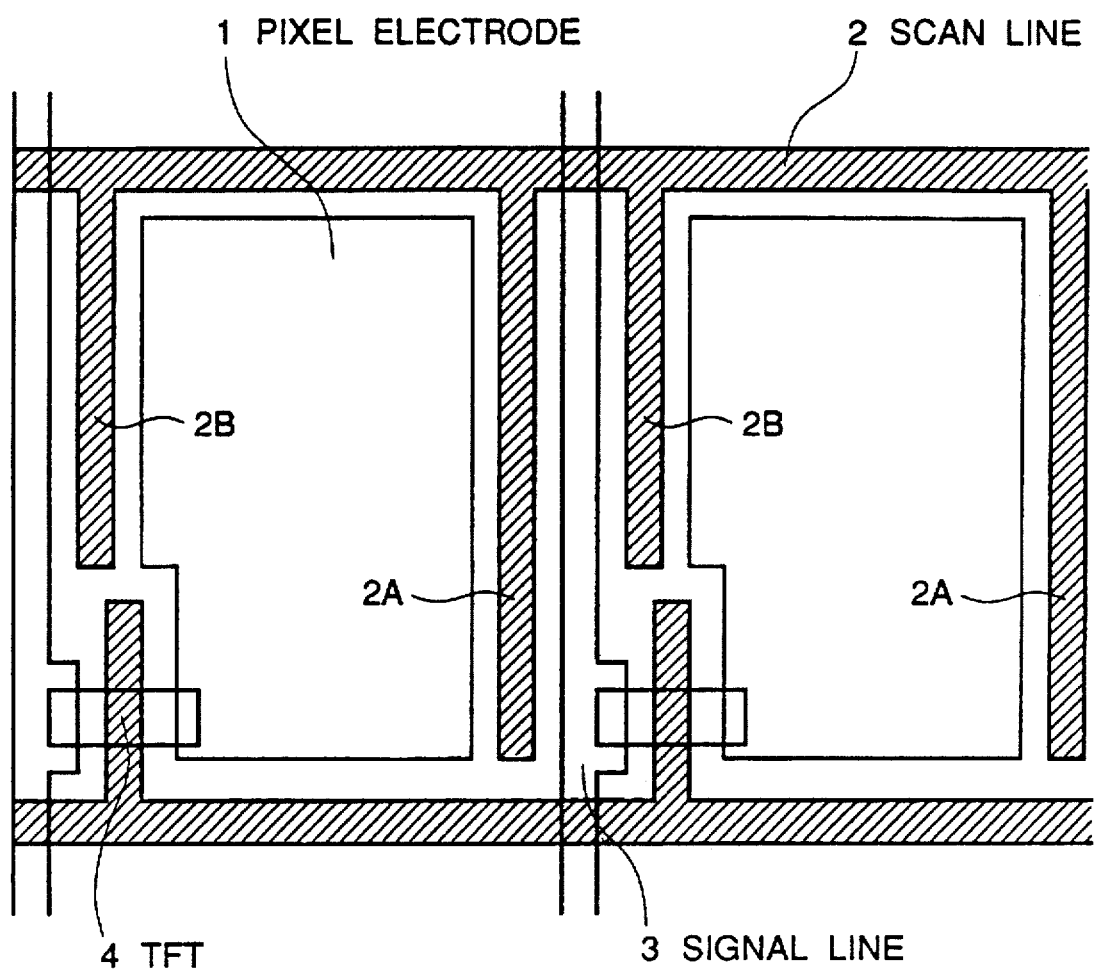
FIGS. 11 to 14 are diagrammatic plan views of the liquid crystal display in accordance with the first aspect of the present invention.

According to the first aspect of the present invention, the twisted nematic liquid crystal is made to have a splay distortion when no voltage is applied. Now, operation of the liquid crystal display in accordance with the first aspect of the present invention, will be described with reference to FIG. 11. FIG. 11 shows a plan view of the liquid crystal display in which a scan line 2 is inserted between a pixel electrode 1 and a signal line 3 in such a manner that from a horizontal scan line 2 positioned at an upper edge side of the pixel electrode, a vertical conductor 2A extends downward between a right edge of the pixel electrode 1 and the signal line 3 and just before a horizontal scan line 2 positioned at a lower edge side of the same pixel electrode, and also, another vertical conductor 2B extends downward between a left edge of the pixel electrode 1 and the signal line 3 and just before a TFT (thin film transistor) 4 associated to the pixel electrode 1. Thus, the pixel electrode 1 is substantially surrounded by only the scan lines 2.

Figure 1:
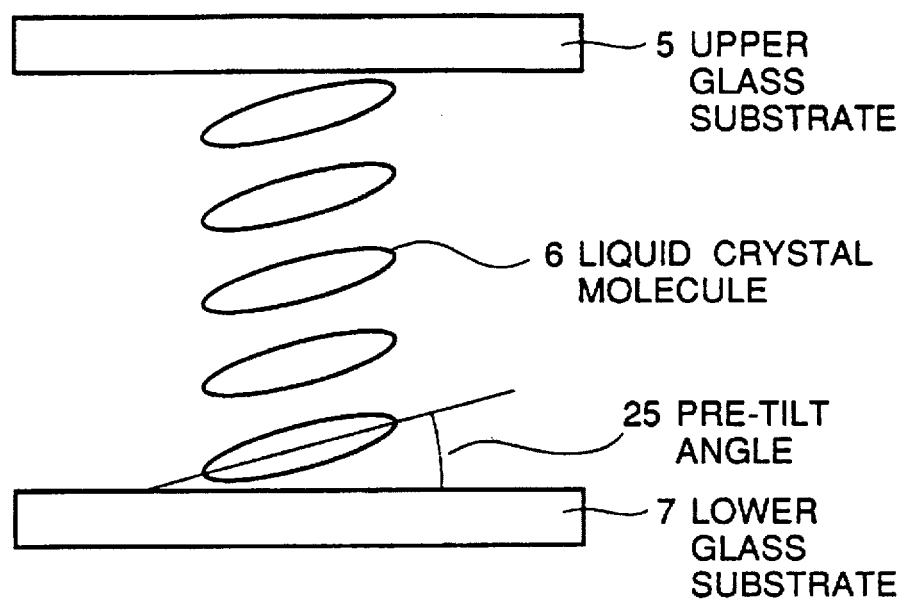
FIG. 1 is a diagrammatic sectional view illustrating a basic construction of a liquid crystal display.
Figure 2:
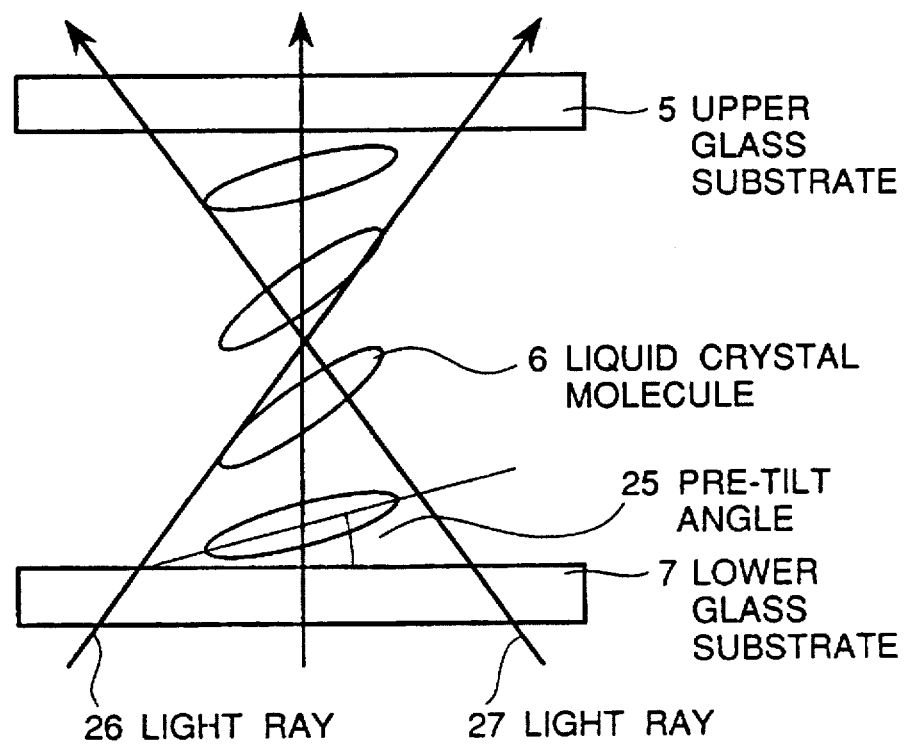
FIG. 2 is a diagrammatic sectional view illustrating the liquid crystal molecules when an voltage is applied to a TN liquid crystal.
Figure 3:
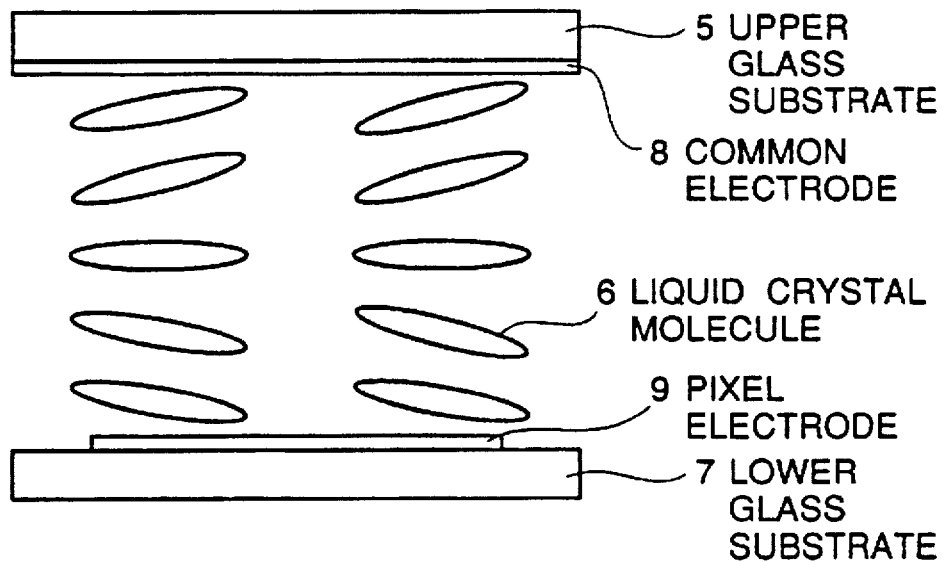
FIG. 3 is a diagrammatic sectional view illustrating a construction of a first conventional liquid crystal display.
Figure 4:
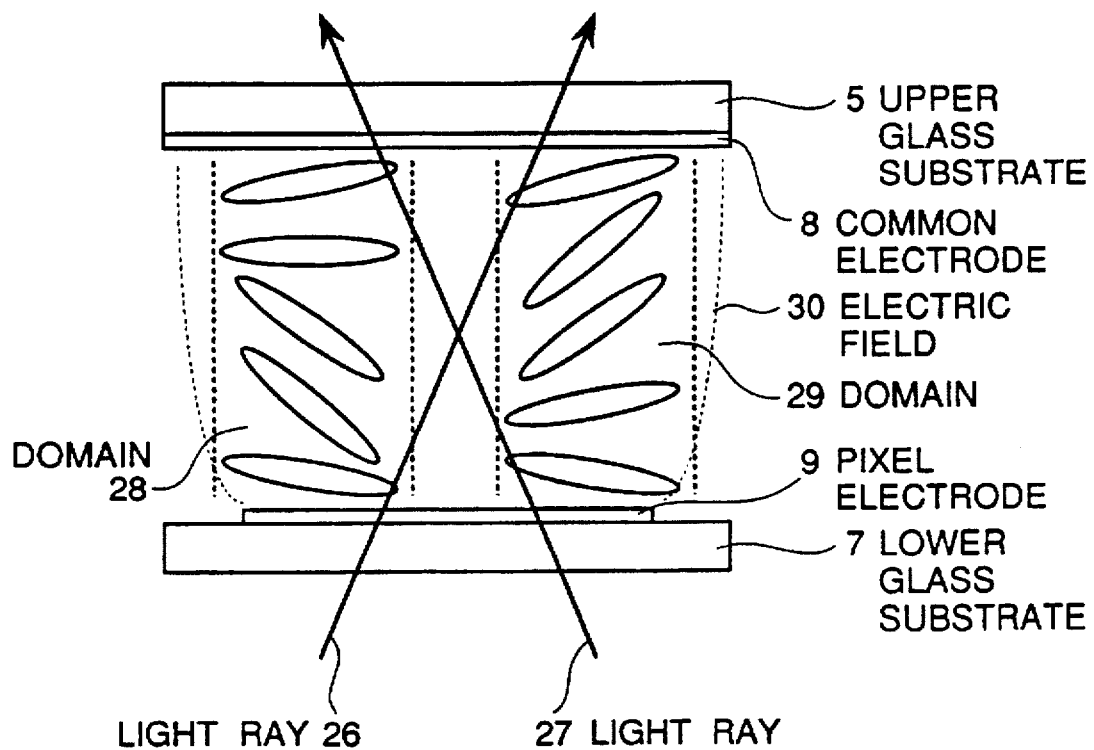
FIG. 4 is a diagrammatic sectional view illustrating the liquid crystal molecules in the first conventional liquid crystal display shown in FIG. 3 when an voltage is applied.
Figure 5:
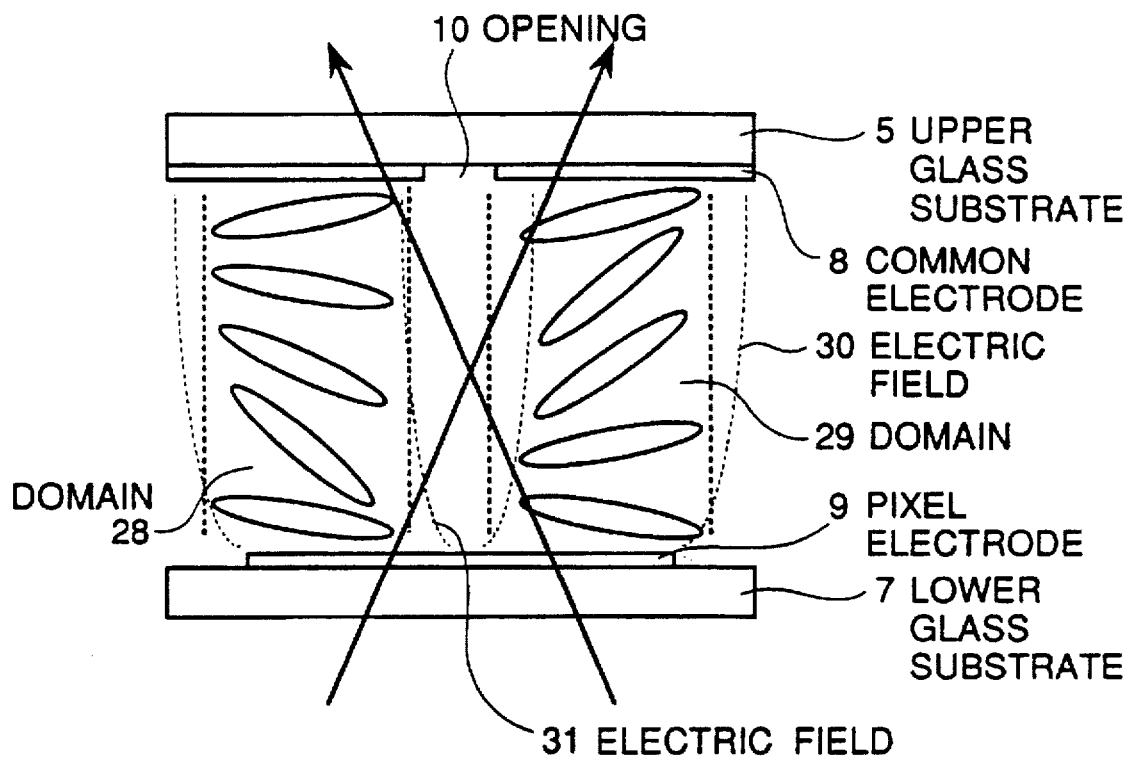
FIG. 5 is a diagrammatic sectional view illustrating the liquid crystal molecules in a second conventional liquid crystal display when an voltage is applied.
Figure 6:
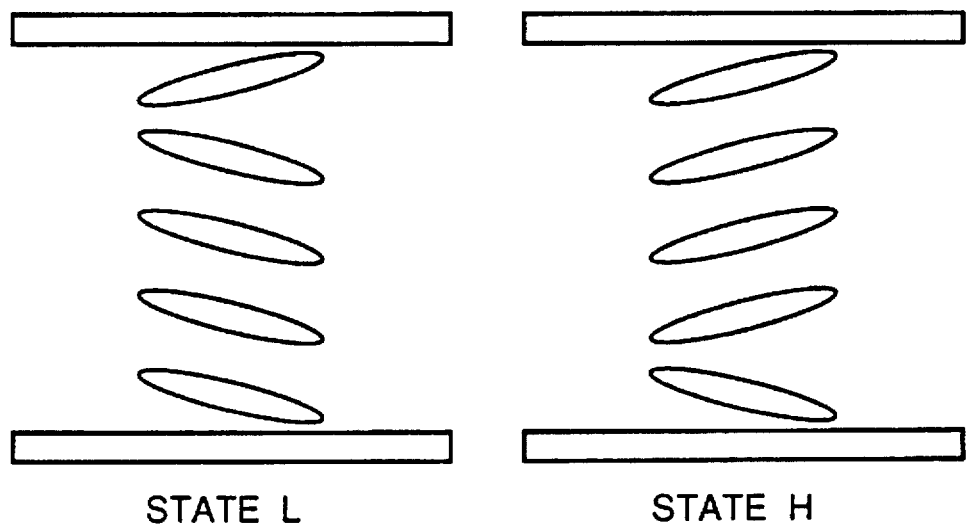
FIG. 6 illustrates, in a diagrammatic sectional view, two different liquid crystal molecule oriented conditions occurring in the second conventional liquid crystal display when an voltage is applied.
Figure 7:
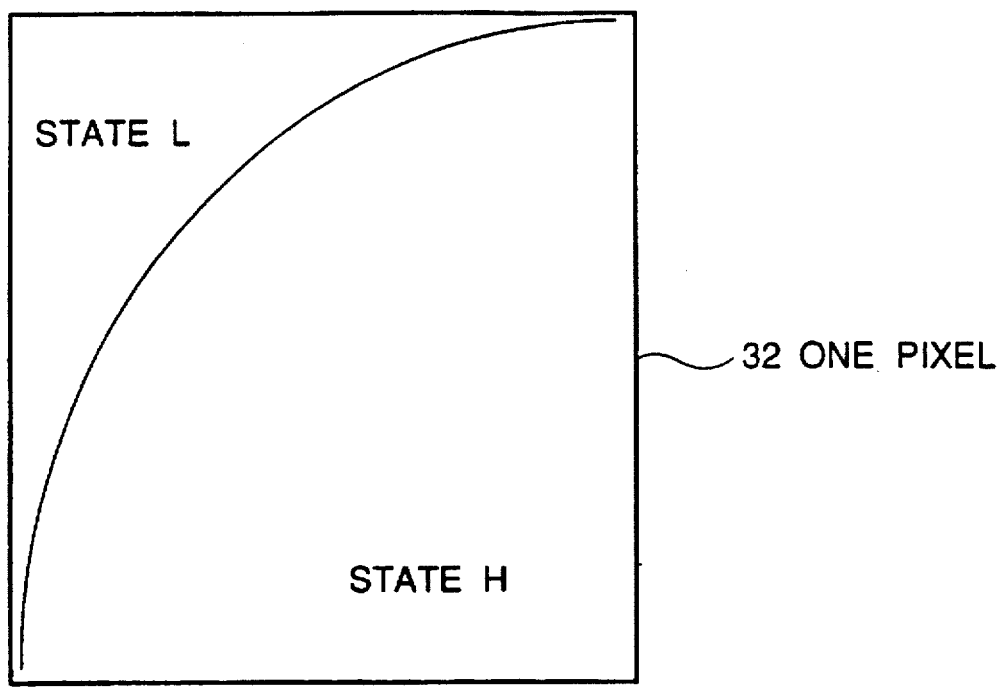
FIGS. 7 and 8 illustrate two different distributions of the two different liquid crystal molecule oriented conditions occurring in the second conventional liquid crystal display when an voltage is applied.
Figure 8:
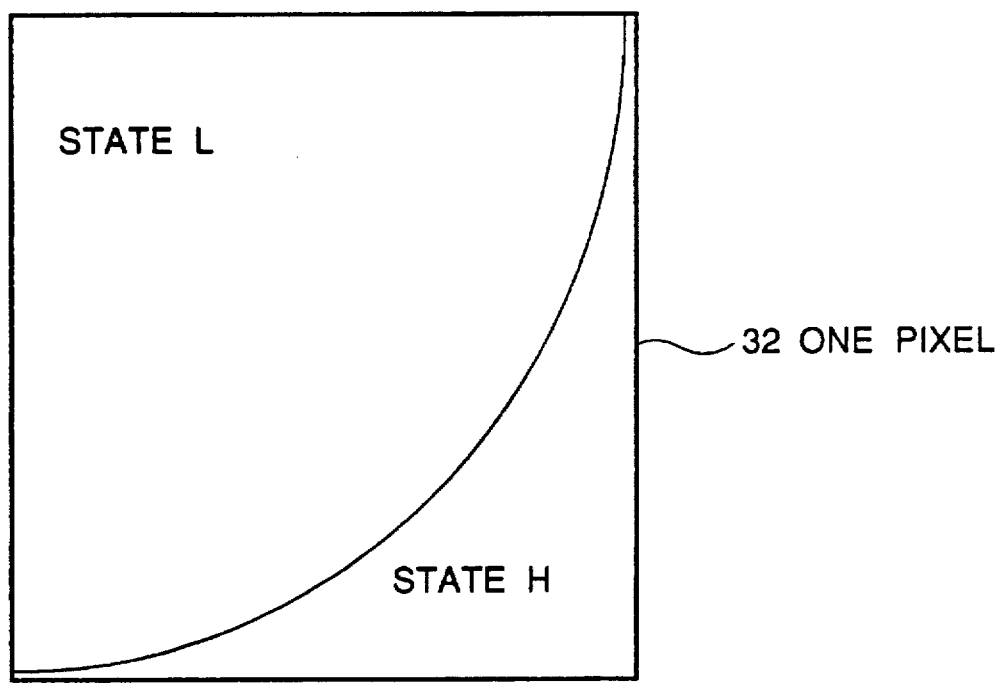
Figure 9:
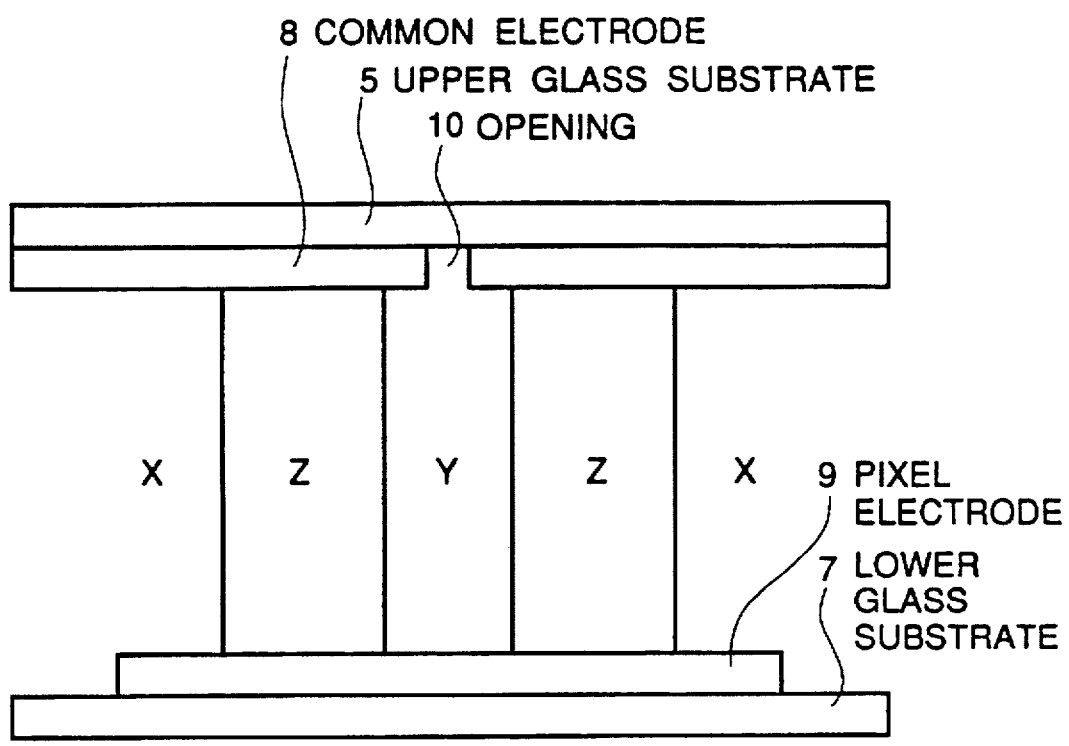
FIG. 9 is a diagrammatic sectional view of the second conventional liquid crystal display for illustrating a problem encountered in the second conventional liquid crystal display.
Figure 10:
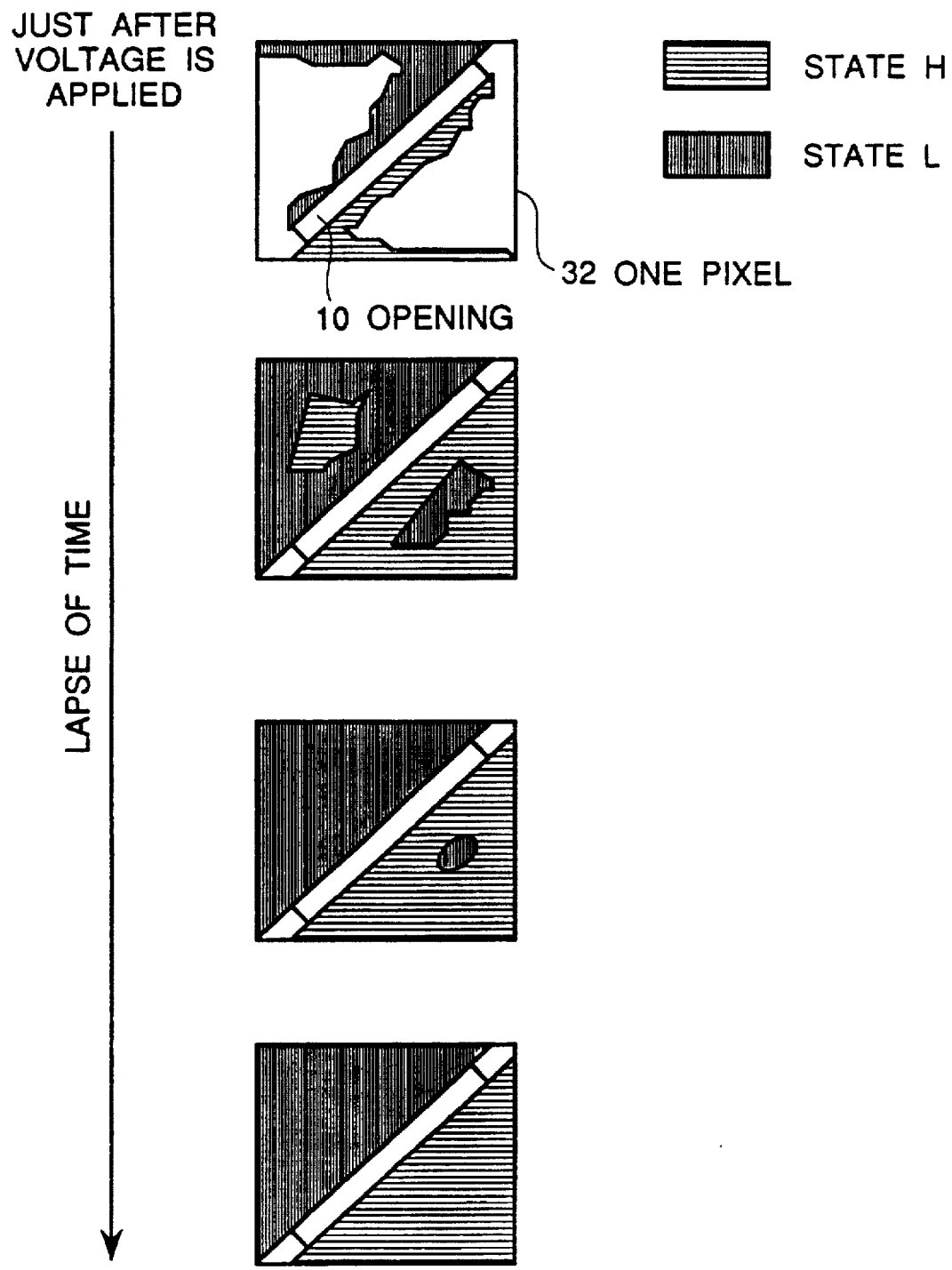
FIG. 10 is a series of diagrams illustrating the change in the distributions of the liquid crystal molecule oriented conditions with lapse of time.

The scan line 2 is applied with a voltage which can be deemed to be a direct current, excepting for a short scan selection period. In comparison with an electric field between the pixel electrode and the signal line, an electric field between the pixel electrode and the scan line is stable since it does not depend upon the content of an image displayed. Therefore, the operation of the liquid crystal display can be stabilized as shown in FIG. 3. This effect of the stabilization is not limited to only the arrangement shown in FIG. 11. Beside, arrangements shown in FIGS. 12 and 13 can be used.

Figure 12:
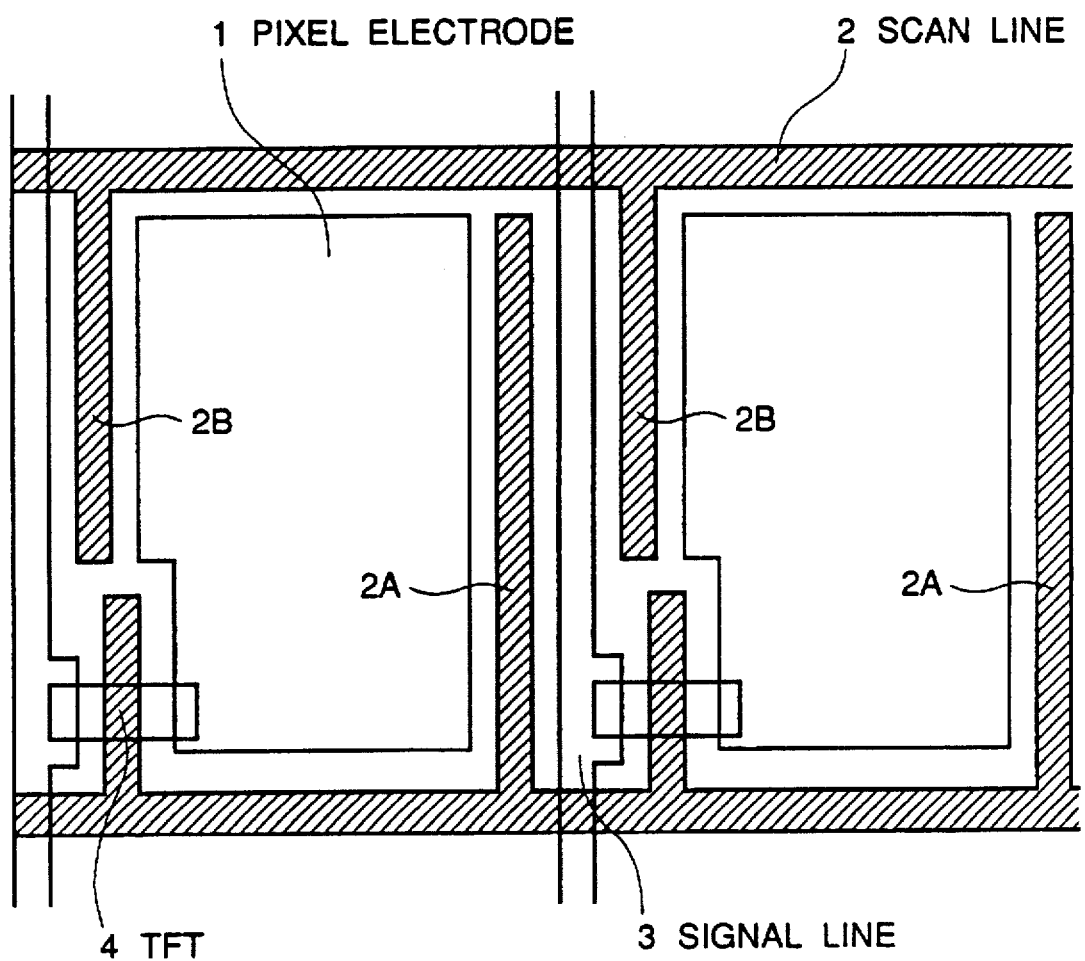

In the arrangement shown in FIG. 12, the scan line 2 is inserted between the pixel electrode 1 and the signal line 3 in such a manner that from a horizontal scan line 2 positioned at a lower edge side of the pixel electrode, a vertical conductor 2A extends upward between a right edge of the pixel electrode 1 and the signal line 3 and just before a horizontal scan line 2 positioned at an upper edge side of the same pixel electrode, and also, from the horizontal scan line 2 positioned at the upper edge side of the same pixel electrode, another vertical conductor 2B extends downward between a left edge of the pixel electrode 1 and the signal line 3 and just before the TFT 4 associated to the pixel electrode 1. In this arrangement, the pixel electrode 1 is substantially surrounded by only the scan lines 2.

Figure 13:
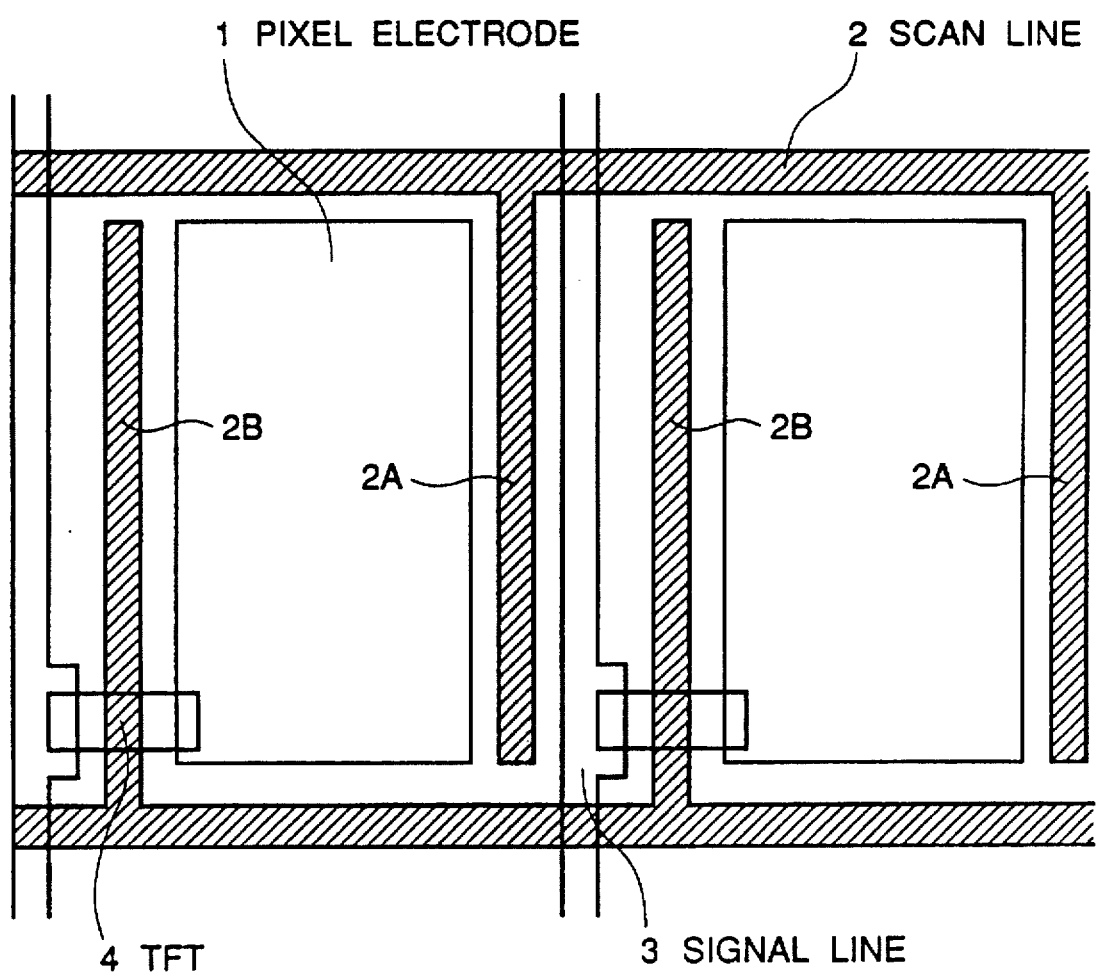

In the arrangement shown in FIG. 13, the scan line 2 is inserted between the pixel electrode 1 and the signal line 3 in such a manner that from a horizontal scan line 2 positioned at an upper edge side of the pixel electrode, a vertical conductor 2A extends downward between a fight edge of the pixel electrode 1 and the signal line 3 and just before a horizontal scan line 2 positioned at a lower edge side of the same pixel electrode, and also, another vertical conductor 2B which extends upward from the horizontal scan line 2 positioned at the lower edge side of the same pixel electrode and which constitutes a gate electrode of the TFT 4 associated to the pixel electrode 1, further extends upward between a left edge of the pixel electrode 1 and the signal line 3 and just before the upper side horizontal scan line 2. In this arrangement, the pixel electrode 1 is substantially surrounded by only the scan lines 2.

Figure 14:
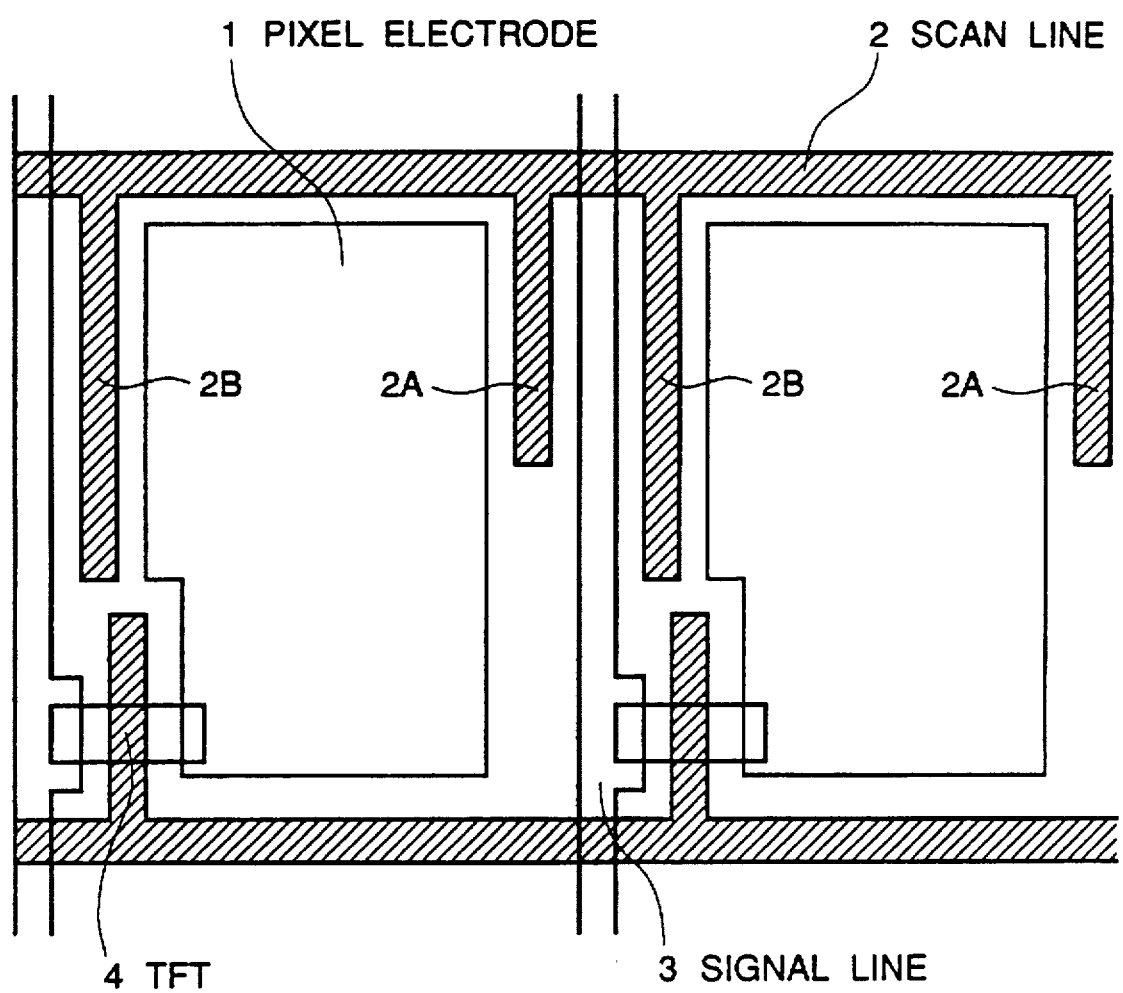

Furthermore, the left edge and the right edge of each pixel electrode 1 are not necessarily required to be completely surrounded by the scan lines 2. For example, as shown in FIG. 14, only a portion of the left edge and the right edge of each pixel electrode 1 may be surrounded by the scan lines 2. In this case, an electric field stabilization can be obtained although it is not completely the same as that of the examples shown in FIGS. 11 to 13.

Now, operation of the liquid crystal display in accordance with the second aspect of the present invention, will be described. As mentioned hereinbefore, when a voltage is applied to a twisted nematic liquid crystal having a splay distortion, it is not possible to equally halve each pixel in the conventional liquid crystal display. The reason for this is that the pre-tilt angles at the upper and lower substrates can have the same constant value, but have distribution. First, operation of the liquid crystal display pixel having distributed pre-tilt angles at the upper and lower substrates will be explained.

Figure 15:
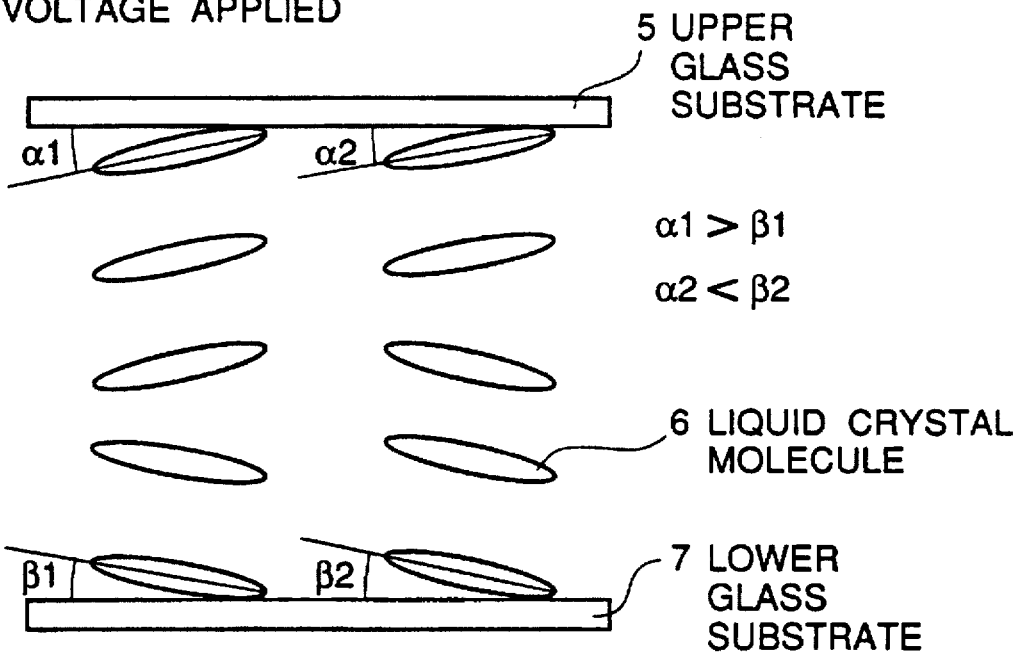
FIG. 15 is a diagrammatic sectional view illustrating the liquid crystal molecules in the liquid crystal display in accordance with the second aspect of the present invention when an voltage is applied.
Figure 15:
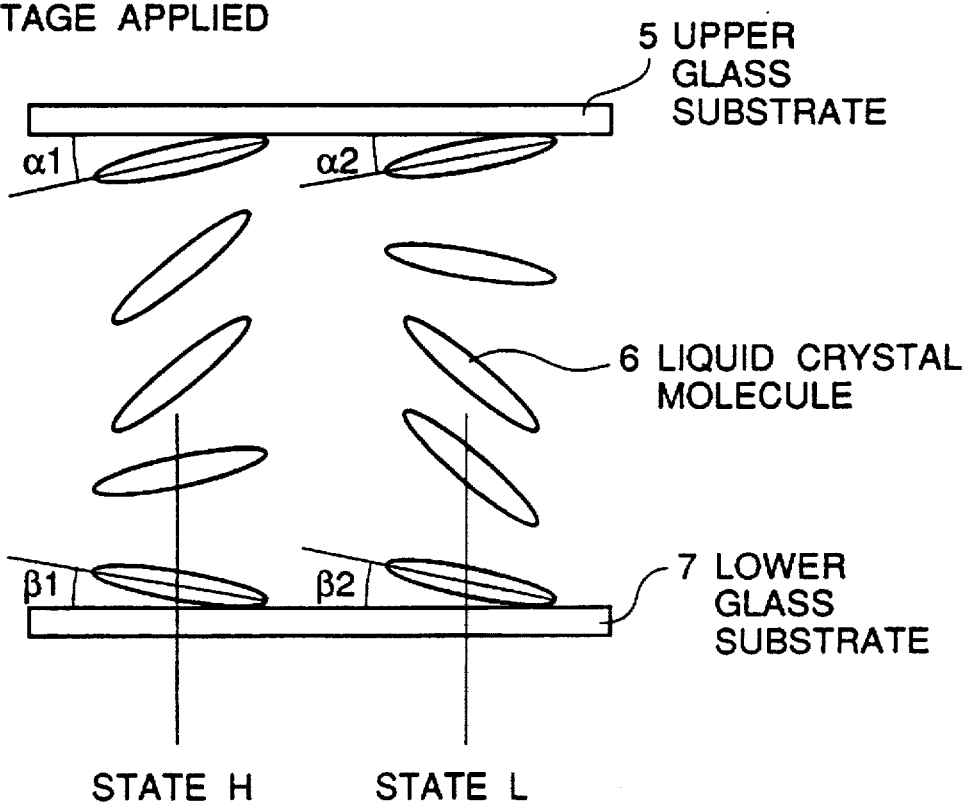

Referring to FIG. 15, there are shown a condition when no voltage is applied, and another condition when a voltage is applied. When no voltage is applied, in a left side region of the liquid crystal shown in FIG. 15, a pre-tilt angle $\alpha1$ at the upper substrate 5 is larger than a pre-tilt angle $\beta1$ at the lower substrate 7. Therefore, when a voltage is applied, the liquid crystal molecules stand up in accordance with the pre-tilt angle at the upper substrate, as shown in a lower haft of FIG. 15. This standing-up condition of the liquid crystal molecules will be called a "state H" in this specification. On the other hand, in a fight side region of the liquid crystal shown in FIG. 15, a pre-tilt angle $\alpha2$ at the upper substrate 5 is smaller than a pre-tilt angle $\beta2$ at the lower substrate 7. Therefore, when a voltage is applied, the liquid crystal molecules stand up in accordance with the pre-tilt angle at the lower substrate, as shown in a lower haft of FIG. 15. This standing-up condition of the liquid crystal molecules will be called a "state L" in this specification.

Accordingly, just after a voltage is applied, domains of the state H and domains of the state L coexist in a mixed condition. With lapse of a time after application of the voltage, two kinds of domains compete, so that a final arrangement of domains is reached. If the pre-tilt angle at the upper substrate is larger than the pre-tilt angle at the lower substrate, the state H finally becomes dominant. If it is to the contrary, the state L finally becomes dominant. As mentioned above, if the pre-tilt angles has distribution in each pixel, the pixel cannot be equally halved when a voltage is applied.

Figure 16:
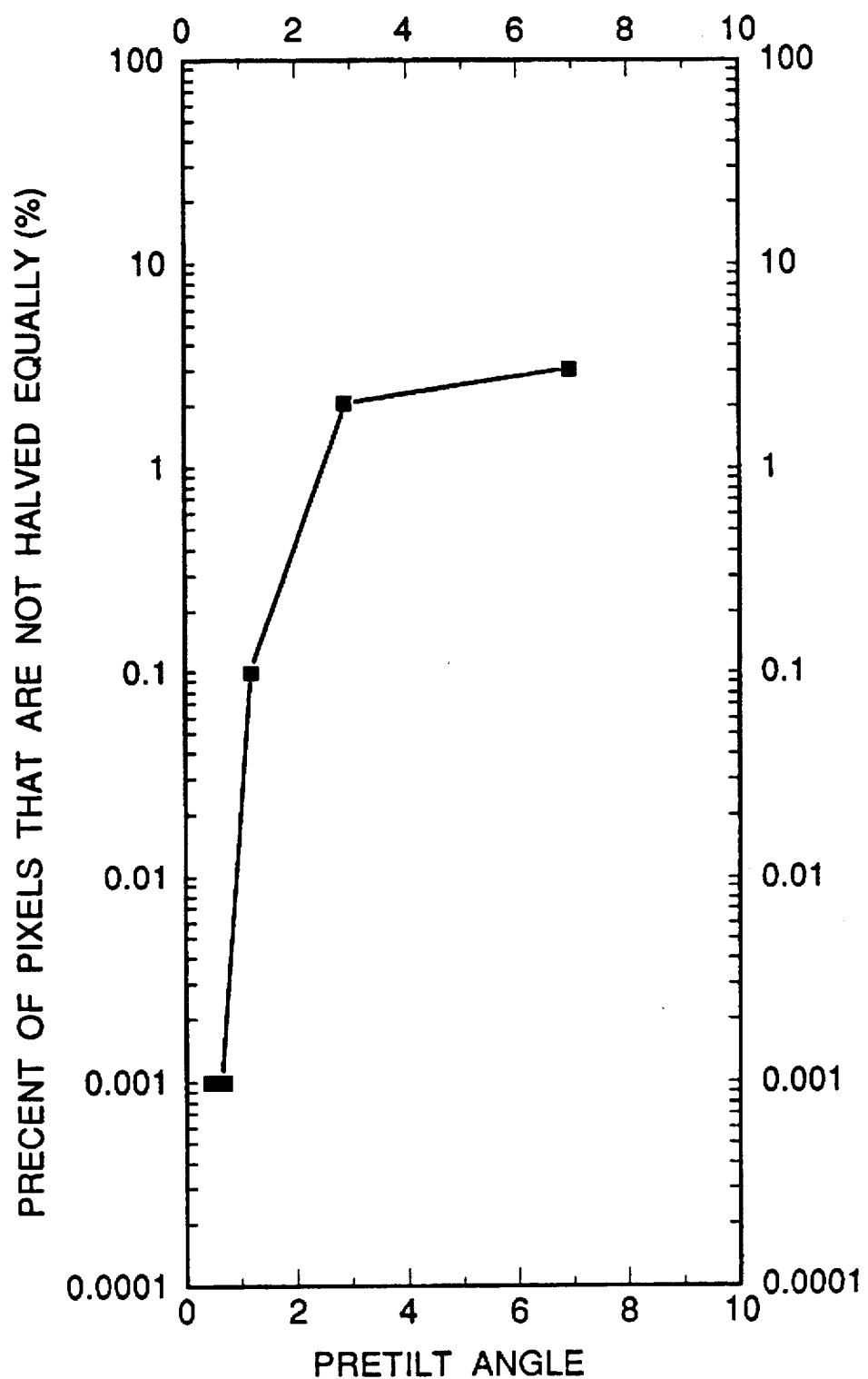
FIG. 16 is a graph illustrating an advantage of the liquid crystal display in accordance with the second aspect of the present invention.

The pre-tilt angle ordinarily measured is an averaged value of the pre-tilt angles in a plane of the substrate. Actually, the pre-tilt angles are distributed to have some width of variations in the plane of the substrate. The inventors examined a correlation between the averaged pre-tilt angle and the number of pixels in which the pixel is equally halved when a voltage is applied. The result thereof is shown in FIG. 16, in which the axis of abscissas indicates a pre-tilt angle measured by a well-known crystal rotation method, and the axis of ordinates shows the percent of pixels that were not halved equally. When the percent of pixels not halved equally is not greater than 0.001%, the cause thereof is considered to be attributable mainly to a spacer(s) which ensures a spacing between the upper substrate and the lower substrate. However, if the measured averaged pre-tilt angle is not greater than 1%, almost the pixels will be halved equally when a voltage is applied. It is considered that this relation is determined for the following reason: When the pre-tilt angles at the substrates have distribution or variation, attention must be paid to the width of the distribution. If the averaged value of the pre-tilt angles is small, it is considered that the width of the distribution of the pre-tilt angles is correspondingly small. However, if the width of the distribution of the pre-tilt angles becomes smaller than a thermal fluctuation of the liquid crystal molecules, it becomes meaningless to pay attention to the width of the distribution of the pre-tilt angles. In other words, it is allowed to consider that the pre-tilt angles at the substrates are uniform or equal. Thus, if the averaged value of the pre-tilt angles is reduced, the width of the distribution of the pre-tilt angles becomes at the same degree as the thermal fluctuation of the liquid crystal molecules, and it is no longer necessary to consider the width of the distribution of the pre-tilt angles. Considering from FIG. 16, it is considered that, at the averaged pre-tilt angle of 1 degree (1°), the width of the distribution of the pre-tilt angles becomes at the same degree as the thermal fluctuation of the liquid crystal molecules. Accordingly, if the pre-tilt angle is not greater than 1°, when a voltage is applied, almost the pixels are halved equally, and therefore, it is possible to obtain a viewing angle dependency symmetrical to the horizontal direction.

Figure 17:
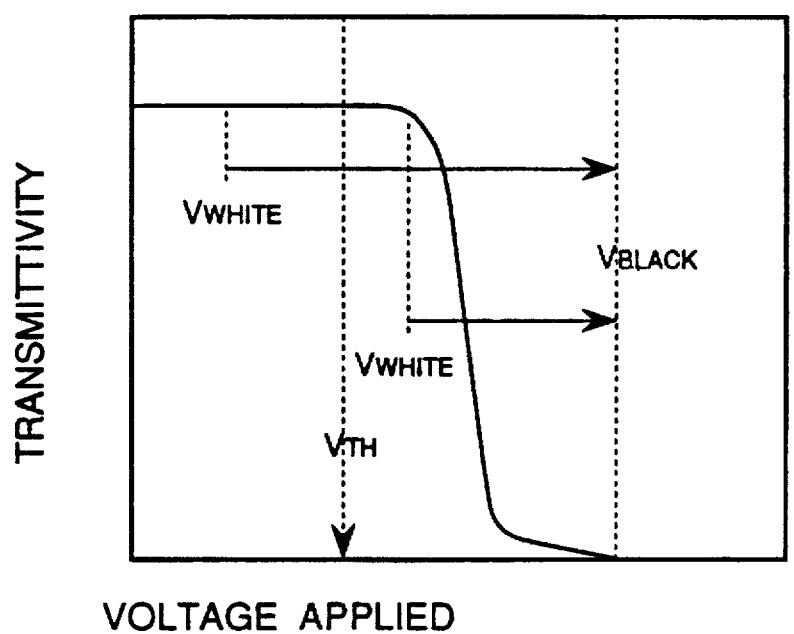
FIG. 17 is another graph illustrating an advantage of the liquid crystal display in accordance with the third aspect of the present invention.

Now, operation of the liquid crystal display in accordance with the third aspect of the present invention, will be described with reference to FIG. 17, which is a graph illustrating an applied voltage/transmittivity characteristics of the twisted nematic liquid crystal display in the normally white mode. The following description will be directed to only the normally white mode, but it is to be noted that the case is also true in the normally black mode.

When an applied voltage changes from a while display voltage VWHITE to a black display voltage VBLACK, the merger and disappearance of the domains of the state H and the state L need a substantial time, and therefore, when a pixel is observed from an inclined direction, the response speed becomes slow. Since the value of the black display voltage VBLACK gives a large influence to a contrast ratio (transmittivity in white indication to transmittivity in black indication), it is not allowable to easily adjust the black display voltage VBLACK. On the other hand, the value of the while display voltage VWHITE does not give a large influence to the contrast ratio, even if the while display voltage VWHITE is adjusted at some degree.

Figure 18:
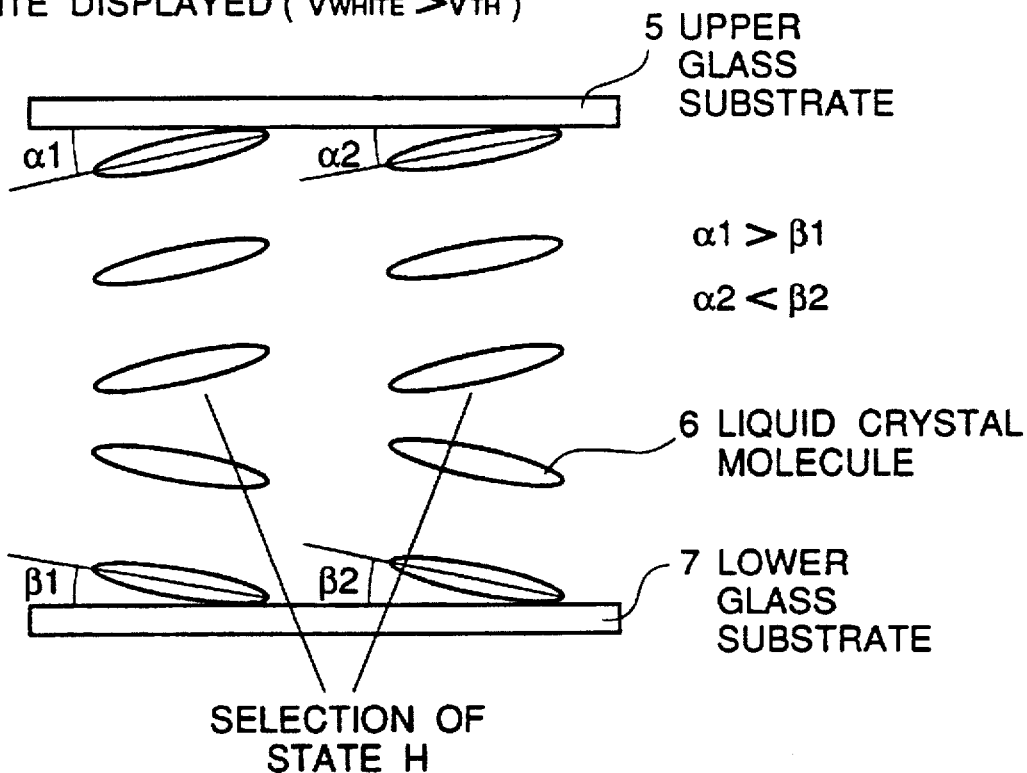
FIG. 18 is diagrammatic sectional views illustrating the liquid crystal molecules in the liquid crystal display in accordance with the third aspect of the present invention when an voltage is applied.
Figure 18:
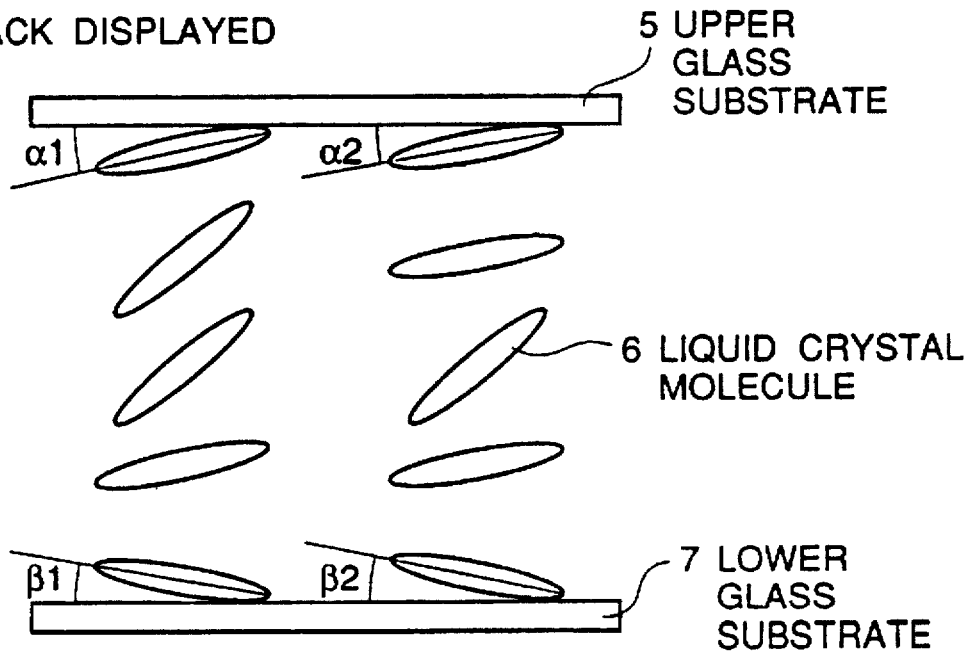

From another viewpoint, the liquid crystal has a threshold voltage VTH. If a voltage applied is less than the threshold voltage VTH, the liquid crystal molecules do not move at all under influence of an electric field applied. When the voltage applied exceeds the threshold voltage VTH, the liquid crystal molecules start to move. As shown in FIG. 18, when the while display voltage VWHITE is set to be larger than the threshold voltage VTH, it is equivalent to the fact that the liquid crystal molecules have previously selected either the state H or the stage L. When the voltage is switched from this condition to the black display voltage VBLACK, the competition between domains of the two different states does not occur, and the response time observed from an inclined direction can be shortened about twenty times.

As mentioned above, the minimum voltage applied in the display operation (the while display voltage VWHITE in the normally white mode, and the black display voltage VBLACK in the normally black mode) is set to be greater than the threshold voltage VTH of the liquid crystal, it is possible to shorten the response time observed from an inclined direction.

Thus, the first, second and third aspects of the present invention have been described with reference to the examples having no opening in the common electrode. However, it is apparent to persons skilled in the art that the first, second and third aspects of the present invention can be applied to a liquid crystal display having an opening in the common electrode.

Figure 19:
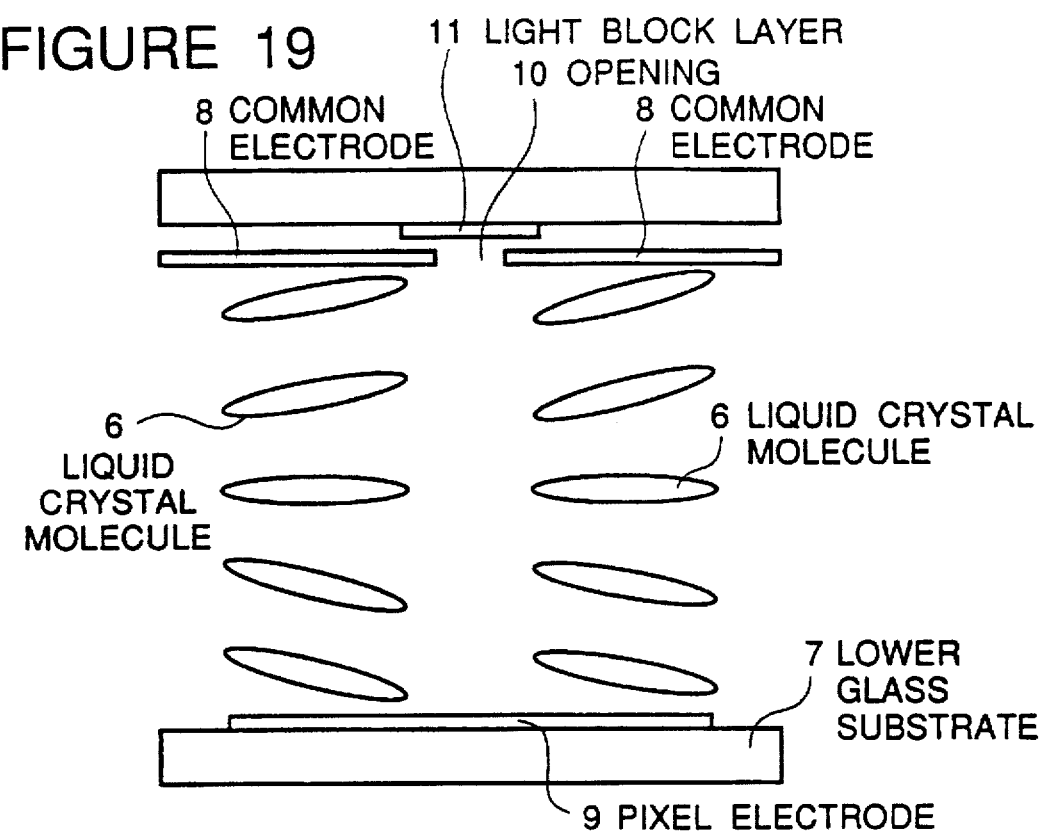
FIG. 19 is a diagrammatic sectional view of the liquid crystal display in accordance with the fourth aspect of the present invention when an voltage is applied.

Now, operation of the liquid crystal display in accordance with the fifth aspect of the present invention, will be described with reference to FIG. 19. As shown in FIG. 19, the upper substrate 5 has a light block layer 11 at a position aligned to the opening 10 of the common electrode 8. With this arrangement, it is possible to prevent a light leakage from a domain boundary where the liquid crystal does not become the black displaying condition when a voltage is applied. This light block layer 11 can be provided on the same substrate as the substrate provided with the common electrode 8, as shown in FIG. 19. In this case, if the light block layer 11 is formed of the same layer as that which is used for forming a light block layer (not shown in FIG. 19) for the TFT, it is possible to avoid the number of steps for manufacturing a color filter substrate.

Figure 20:
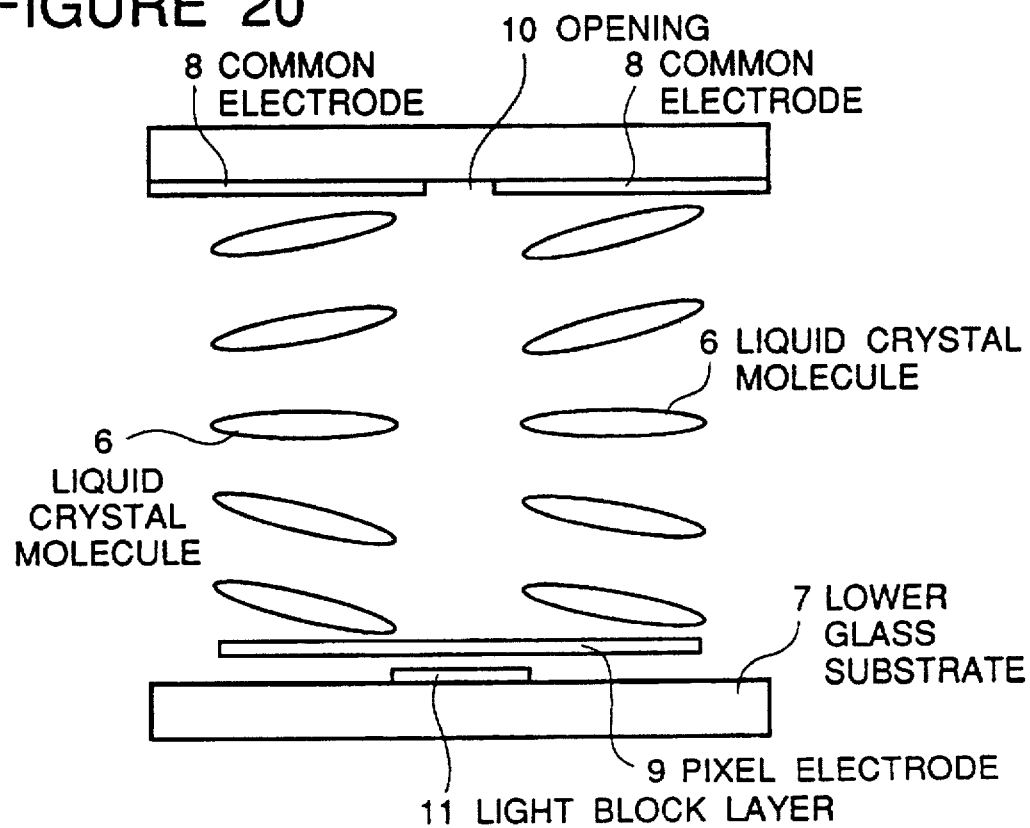
FIG. 20 is a diagrammatic sectional view of the liquid crystal display in accordance with the fourth aspect of the present invention when an voltage is applied.

Alternatively, as shown in FIG. 20, the light block layer 11 may be provided on the substrate 7 on which the TFT is formed. In this case, if the light block layer 11 is formed of a layer which is used in the process of manufacturing the TFT, it is possible to avoid complication of the process for manufacturing the TFT. For example, the light block layer 11 can be formed by leaving a portion of a gate layer or a drain layer of the TFT. Thus, it is possible to manufacture a liquid crystal display having a high contrast ratio with no light leakage at the time of the black indication, without increasing the manufacturing steps for the light block layer.

Figure 21:
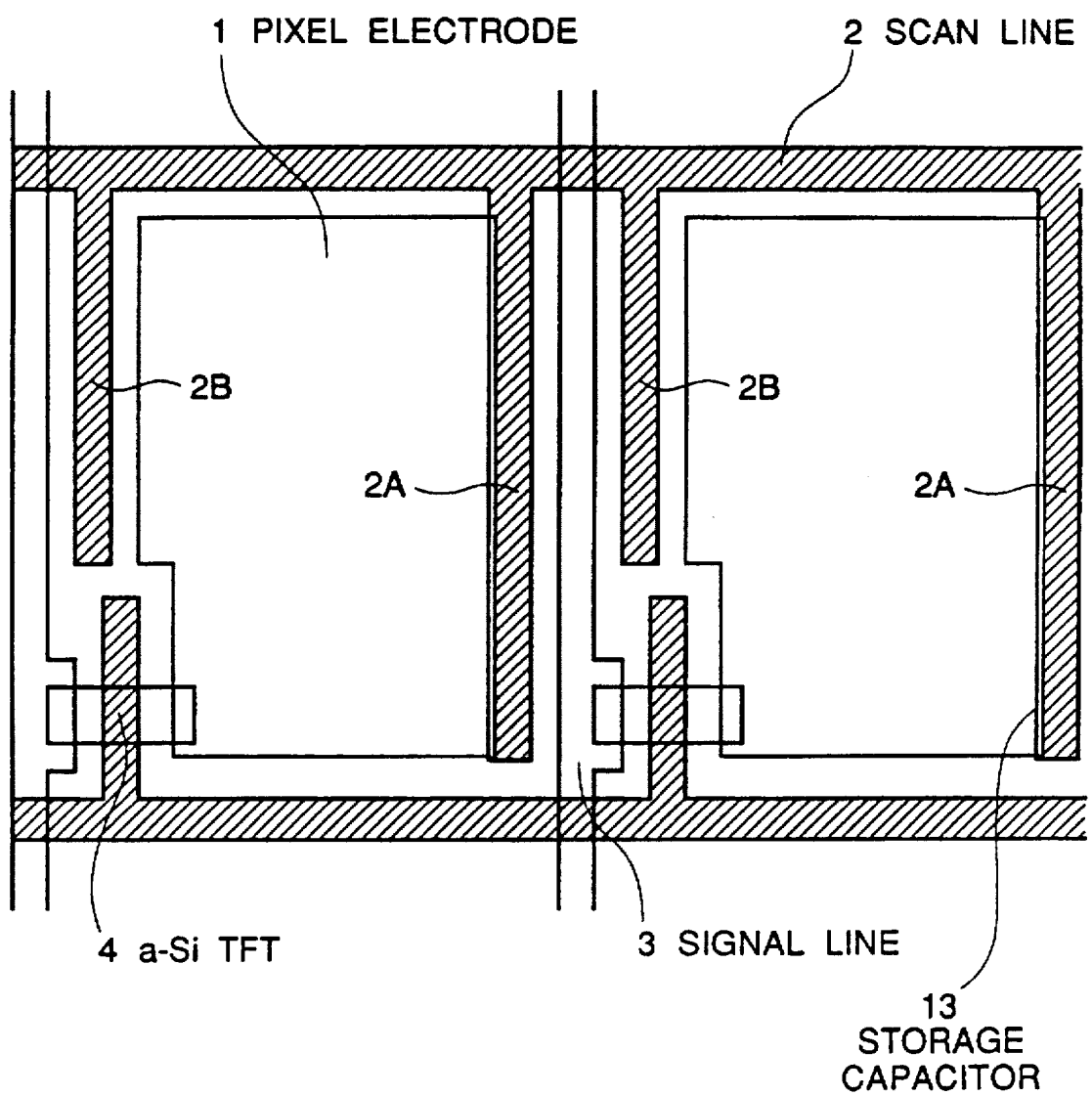
FIG. 21 is a diagrammatic plan view of an embodiment of the liquid crystal display in accordance with the first aspect of the present invention.

Referring to FIG. 21, there is shown a diagrammatic plan view of an embodiment of the liquid crystal display in accordance with the first aspect of the present invention.

In the shown embodiment of the liquid crystal display, each pixel has a size of 50 μm×150 μm, and the number of pixels is 480×640×3. The orthogonal screen size of the liquid crystal display is 120 mm. The TFT is an amorphous silicon TFT.

Amorphous silicon TFT 12 were formed on a glass substrate (TFT substrate) by repeating a film deposition step and a photolithography step in a manner well known to persons skilled in the art. Furthermore, each scan line 2 and each signal line 3 were formed of a chromium thin film, and each pixel electrode 1 was formed of ITO thin film (indium-thin-oxide). In this embodiment, all four edges of each pixel electrode is adjacent to the scan line as seen from FIG. 21. In addition, the pixel electrode 1 partially overlaps a vertical scan line portion 2A extending from a horizontal scan line with an insulator film being interposed between the pixel electrode 1 and the vertical scan line portion 2A, so that a storage capacitor 13 is constituted.

On the other hand, a color filter substrate (not shown) having a TFT light block layer formed of a chromium thin film, a color filter layer, an overcoat layer and a common electrode formed of the ITO thin film, was used.

Figure 22:
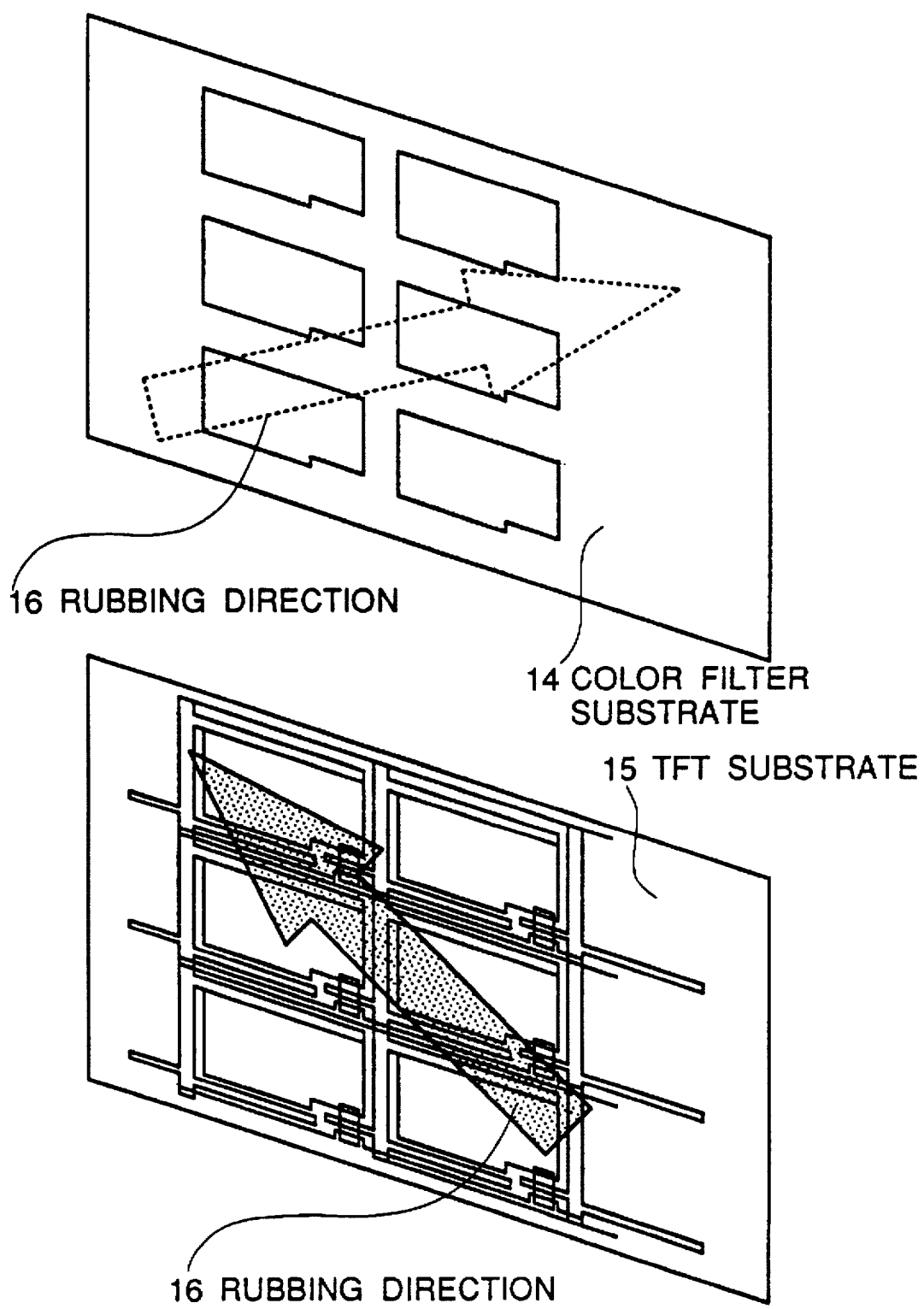
FIG. 22 is diagrammatic perspective views illustrating a pair of substrates used in the embodiment of the liquid crystal display in accordance with the first aspect of the present invention.

After both of the substrates were washed, a polyimide solution (Japan Synthetic Rubber Co. Lts., AL1051) is printed by an offset printing machine, and then, baked at 90° C. and 200° C. Thereafter, a rubbing treatment was performed using a buffing cloth of rayon. The rubbing direction is as shown in FIG. 22.

Furthermore, a bonding agent was applied to a periphery of the display screen region of the TFT substrate 15, and latex balls having a diameter of 6 μm were distributed on the color filter substrate 14 as a spacer. Then, both the substrates were located to oppose to each other, and adjusted in position so that the pixel structures on both the substrates are aligned to each other. The substrates were bonded under pressure. The rubbing directions of both the substrates when the substrates were bonded to each other, were as shown in FIG. 22. Thereafter, the bonded substrates were located in a vacuum chamber, and the vacuum chamber was evacuated. Furthermore, a nematic liquid crystal (Merck & Co. Ltd., ZLI4792) was injected into a space between the substrates. The nematic liquid crystal injected was mixed with a left chiral agent to have a natural pitch length of 70 μm. Thereafter, a filling hole was sealed, and a driving integrated circuit was connected to perform a display operation.

Figure 23:
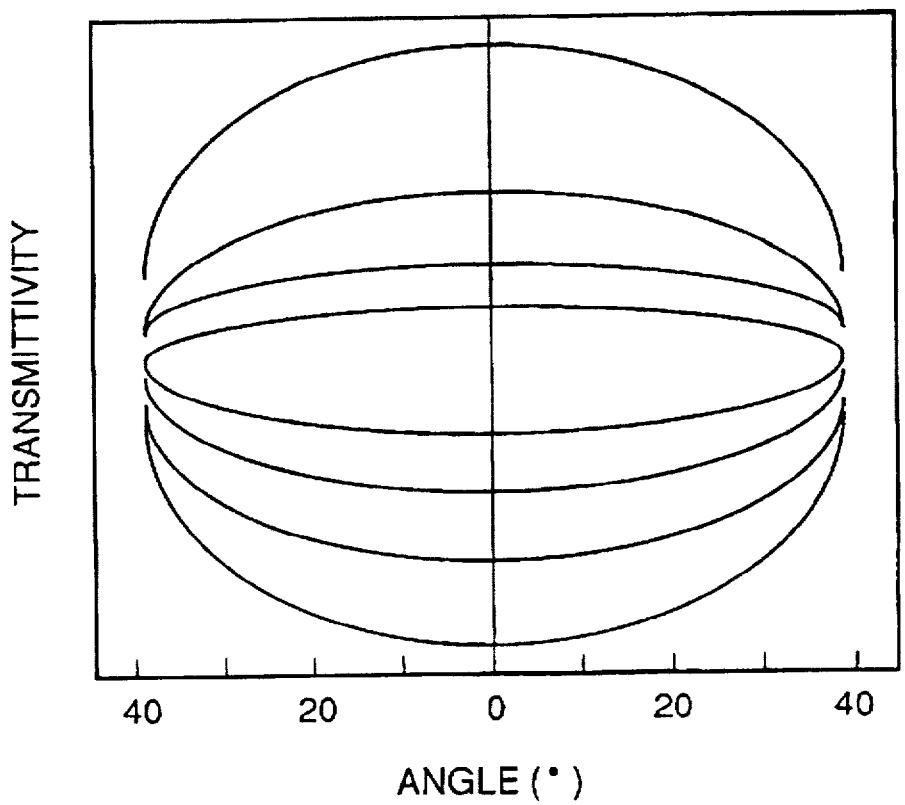
FIG. 23 is a graph showing a viewing angle-transmittivity in the embodiment of the liquid crystal display in accordance With the first aspect of the present invention.

The viewing angle dependency of the twisted nematic liquid crystal display thus manufactured was examined. The liquid crystal display to be examined was mounted on a rotary stage, and a color brightness meter (TOPKON BM-5A) was located in front of the rotary stage. The liquid crystal display screen was caused to display eight gray scales, and the viewing angle dependency was measured at each of the eight gray scales. The result of the measurement is, shown in FIG. 23. As seen from FIG. 23, the order of the brightness among the respective gray scales were not inverted within a range of the viewing angle not greater than 40°. In a conventional twisted nematic liquid crystal display, the order of the brightness among the respective gray scales were inverted within a range of the viewing angle not greater than 10°.

As seen from the above, the liquid crystal display in accordance with the first aspect of the present invention has a viewing angle range which is four times or more than the conventional one.

Now, a first embodiment of the liquid crystal display in accordance with the second aspect of the present invention will be described.

Figure 24:
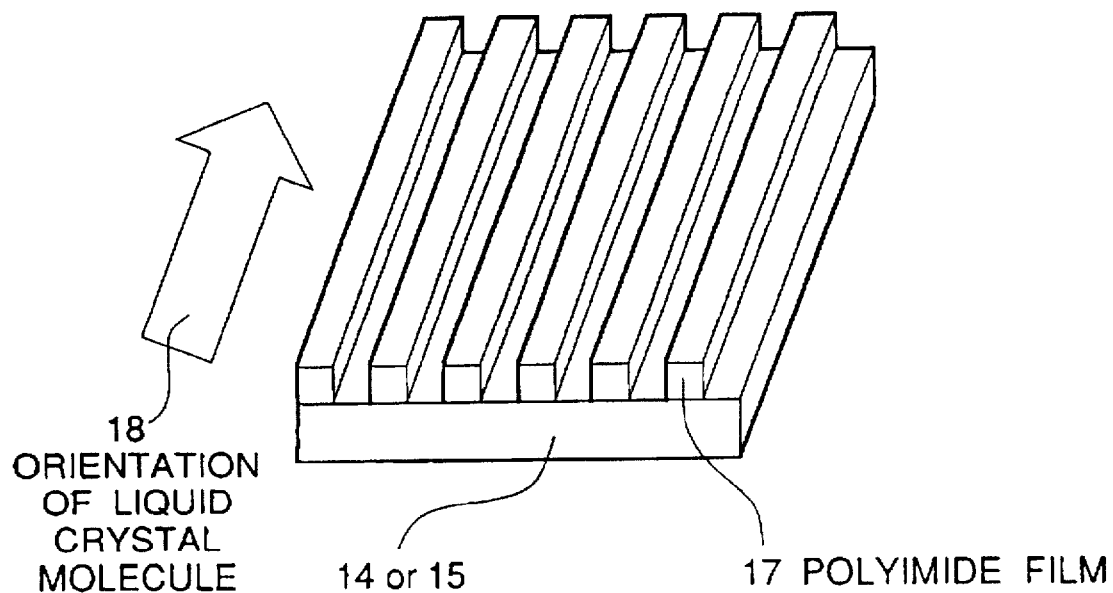
FIG. 24 is a diagrammatic perspective view of an embodiment of the liquid crystal display in accordance with the second aspect of the present invention.

In this embodiment, a TFT substrate and a color filter substrate similar to the TFT substrate 14 and the color filter substrate 15 used in the embodiment of the liquid crystal display in accordance with the first aspect of the present invention, were used But, in place of the rubbing treatment in the embodiment of the liquid crystal display in accordance with the first aspect of the present invention, the following orientation treatment was performed for both the substrates: After a photosensitive polyimide was deposited, the baking was performed at 90° C. to form a photosensitive polyimide thin film 17 on the TFT substrate 14 and the color filter substrate 15. Furthermore, the photosensitive polyimide thin film 17 is patterned by selective exposure and development, so as to form a line-and-space grooved structure having a width of 2 μm and a pitch of 2 μm, as shown in FIG. 24, and further the baking was performed at 160° C.

In the above mentioned orientation processing, since there is not directivity such as the robbing treatment, the pre-tilt angle becomes zero (0°). Therefore, in order to realize a twisted nematic structure, the substrates were bonded to each other in such a manner that the direction of the grooved structure on one substrate is orthogonal to the direction of the grooved structure on the other substrate. Similarly, a nematic liquid crystal (Merck & Co. Ltd., ZLI-4792) was injected into a space between the substrates. Thereafter, a filling hole was sealed, and a driving integrated circuit was connected to perform a display operation on a polarizing microscope. The liquid crystal display pixels were observed by the microscope through orthogonal polarizers. As a result; it was observed that each pixel was halved equally with a boundary of a diagonal line when black is displayed. Of 921,600 pixels excepting for pixels having unevenness considered to be attributable to the influence of the spacer, no pixel that was not halved equally could not be found.

Next, a second embodiment of the liquid crystal display in accordance with the second aspect of the present invention will be described.

In this second embodiment, after a polystyrene thin film was formed in place of the polyimide as mentioned above, the rubbing treatment was performed. The process excluding the orientation process was the same as the embodiment of the first aspect of the present invention. By rubbing the polystyrene thin film, the liquid crystal molecules are oriented in a direction orthogonal to the rubbing direction. This is considered due to a side chain of the polystyrene. Because of this, the orientation direction has no distinction between a right direction and a left direction, and therefore, the pre-tilt angle becomes zero (0°).

The TFT substrate and the color filter substrate were bonded in such a manner that the orientation directions are orthogonal to each other, so as to be able to realize a twisted nematic structure. By causing the liquid crystal display thus formed to perform a display operation, it was observed by the polarizing microscope similarly to the first embodiment. Similarly, it was observed that all pixels were halved equally.

Figure 25:
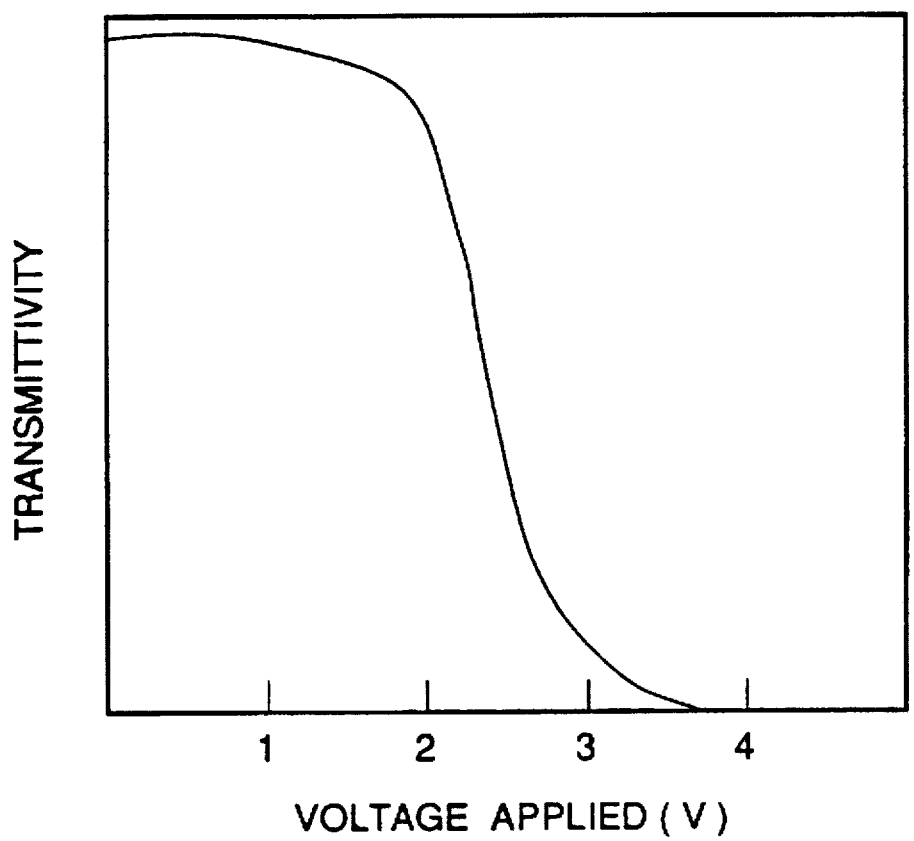
FIG. 25 is a graph showing a voltage-transmittivity characteristics in the embodiment of the liquid crystal display in accordance with the second aspect of the present invention.

Now, an embodiment of the liquid crystal display in accordance with the third aspect of the present invention will be described with reference to FIG. 25. In this embodiment, the second embodiment of the liquid crystal display in accordance with the second aspect of the present invention was used. Therefore, FIG. 25 is a graph showing a voltage-transmittivity characteristics of the liquid crystal ZLI-4762 used in the second embodiment of the liquid crystal display in accordance with the second aspect of the present invention.

The liquid crystal ZLI-4762 has a threshold voltage of 1.95 V. Therefore, similarly to the embodiments as mentioned above, a transition response of liquid crystal domains in the pixel was observed by the polarizing microscope through orthogonal polarizers. In order to observe the transition response, a stroboscopic light source is energized in synchronism with application of the voltage. In addition, by gradually shifting the timing between the voltage application and the stroboscopic light illumination, the transition response was observed while taking photographs.

When the voltage applied to the liquid crystal was changed from 1.5 V to 6.0 V, the transition response was observed. The domain orientation was obtained about one second after change of the voltage applied. When the voltage applied to the liquid crystal was changed from 2.3 V (which is higher than the threshold voltage) to 6.0 V, the transition response was observed similarly. The domain orientation was obtained about 60 msec after change of the voltage applied.

In addition, the liquid crystal display was operated between polarizers orthogonal to each other. When a moving picture was displayed by using the while display voltage of 1.5 V, the moving picture was normally displayed when it was observed from a front position, but when it was observed from an inclined direction, a phenomenon in which the moving picture threads behind was found. On the other hand, when a moving picture was displayed by using the while display voltage of 2.3 V, even if the moving picture was observed from an inclined direction, a phenomenon in which the moving picture threads behind could not found.

Figure 26:
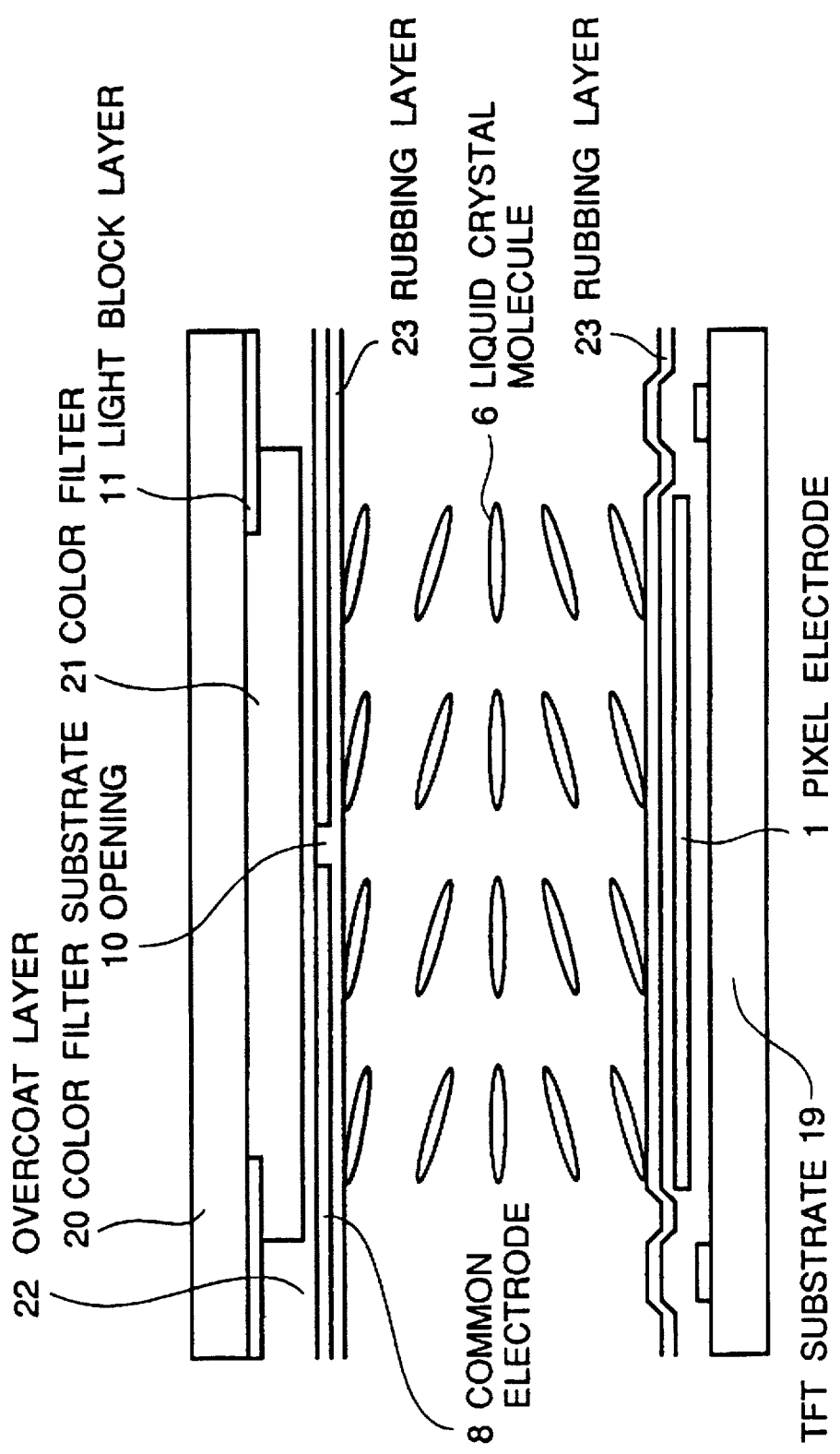
FIGS. 26 and 27 are diagrammatic sectional views of embodiments of the liquid crystal display in accordance with the fourth and fifth aspects of the present invention.

Now, an embodiment of the liquid crystal display in accordance with the fourth aspect of the present invention will be described with reference to FIG. 26. In this embodiment, a color filter substrate 20 having a structure shown in FIG. 26 was used. The color filter substrate 20 has an opening 10 which is formed in the common electrode 8 and which is provided for each of the pixel electrodes 1. This opening 10 has a width of 5 μm. The TFT substrate is the same as that used in the embodiment of the first aspect of the present invention.

The liquid crystal display of this embodiment was manufactured in the same process as the embodiment of the first aspect of the present invention. After the liquid crystal display was completed, the pixels were observed by a polarizing microscope. A bright line was observed along the opening of the common electrode. Namely, the pixel was halved equally. In addition, the white display voltage was adjusted similarly to the above mentioned embodiment. As a result, a similar improvement of the response speed could be confirmed.

Figure 27:
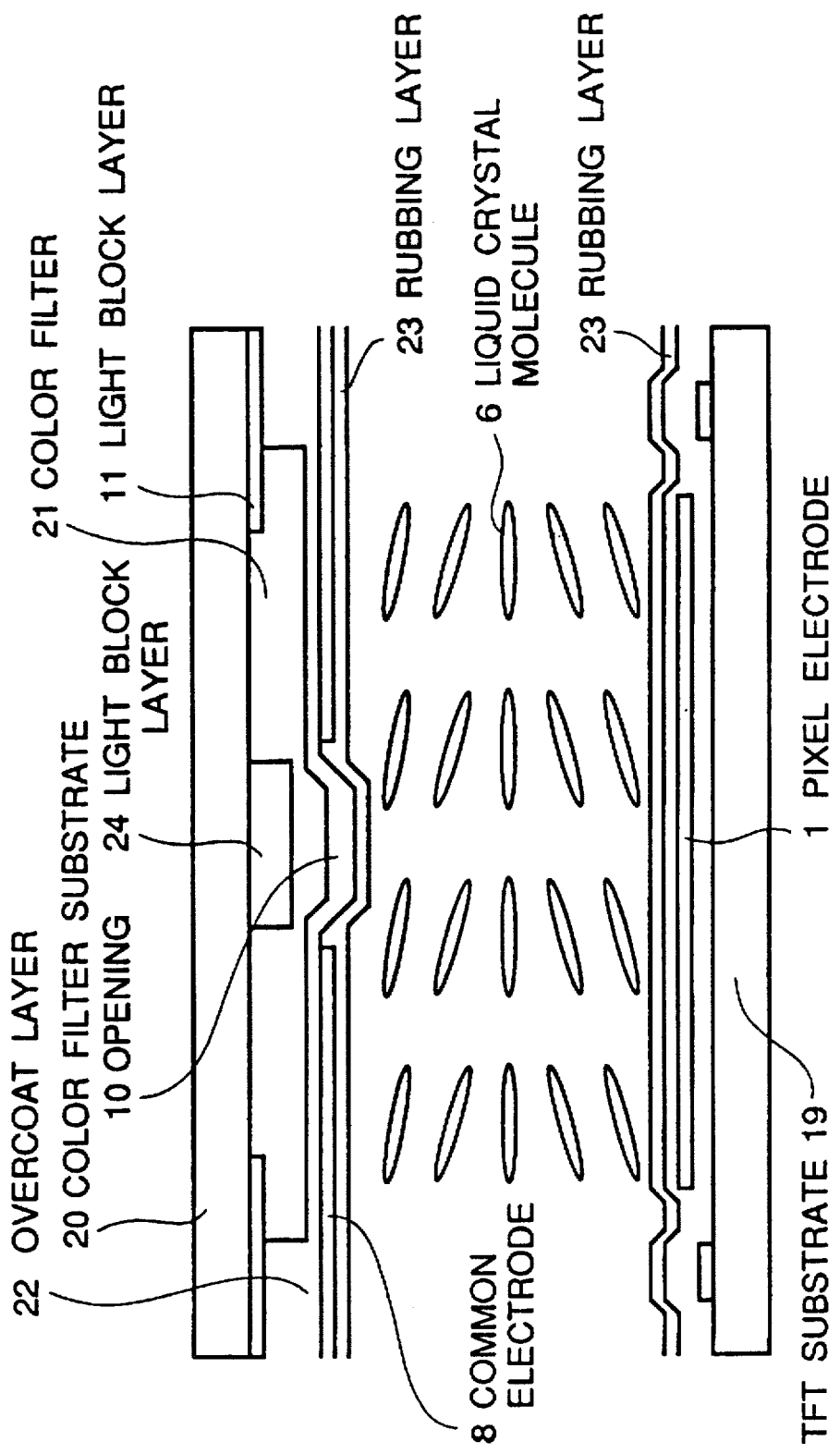

Next, an embodiment of the liquid crystal display in accordance with the fifth aspect of the present invention will be described with reference to FIG. 27. In this embodiment, a color filter substrate 20 having a structure shown in FIG. 27 was used. The color filter substrate 20 has a light block layer 11 formed of a chromium thin film; a color filter layer 21 including a pigment, a light block layer 24 including a black pigment and located at a position in alignment with an opening formed in a common electrode for the purpose of covering a domain boundary, an overacting layer 22 for planalizing the surface, and a common electrode 8 formed of an ITO thin film and having an opening 10 provided for each of the pixel electrodes 1. This opening 10 has a width of 5 μm, and the light block layer 24 has a width of 8 μm.

Excepting for the color filter structure, the liquid crystal display of this embodiment was manufactured in the same process as the embodiment of the first aspect of the present invention. After the liquid crystal display was completed, the pixels were observed by a polarizing microscope. It was observed that the bright line was observed in the embodiment of the fourth aspect of the present invention is shielded by the light block layer 24.

The invention has thus been shown and described with reference to the specific embodiments. However, it should be noted that the present invention is in no way limited to the details of the illustrated structures but changes and modifications may be made within the scope of the appended claims.

We claim:

1. A liquid crystal display apparatus comprising:
   a twisted nematic liquid crystal sandwiched between a first substrate having a common electrode and a second substrate having a plurality of pixel electrodes, said twisted nematic liquid crystal having a splay distortion when no voltage is applied and a pre-tilt angle at said first and second substrates not greater than 1 degree; and
   a scan line inserted between a pixel electrode and a signal electrode.

2. A liquid crystal display apparatus claimed in claim 1 wherein the common electrode has an opening provided for each of the pixel electrodes.

3. A liquid crystal display apparatus claimed in claim 2 wherein a light block layer is preferably provided in positional alignment with each opening of the common electrode.

4. A liquid crystal display apparatus comprising a twisted nematic liquid crystal sandwiched between a first substrate having a common electrode and a second substrate having a plurality of pixel electrodes, the twisted nematic liquid crystal having a splay distortion when no voltage is applied, wherein a pre-tilt angle of the liquid crystal at the first and second substrate is not greater than 1 degree.

5. A liquid crystal display apparatus claimed in claim 4 wherein the common electrode has an opening provided for each of the pixel electrodes.

6. A liquid crystal display apparatus claimed in claim 5 wherein a light block layer is preferably provided in positional alignment with each opening of the common electrode.

7. A liquid crystal display apparatus comprising:
   a twisted nematic liquid crystal sandwiched between a first substrate having a common electrode and a second substrate having a plurality of pixel electrodes, the twisted nematic liquid crystal having a splay distortion when no voltage is applied; and
   means for applying a voltage maintained during a display operation at level greater than or equal to a threshold voltage at which molecules of the liquid crystal begin to move under an influence of an applied electric field.

8. A liquid crystal display apparatus chimed in claim 7 wherein the common electrode has an opening provided for each of the pixel electrodes.

9. A liquid crystal display apparatus claimed in claim 8 wherein a fight block layer is preferably provided in positional alignment with each opening of the common electrode.

10. A method for driving a liquid crystal display apparatus comprising a twisted nematic liquid crystal sandwiched between a first substrate having a common electrode and a second substrate having a plurality of pixel electrodes, the twisted nematic liquid crystal having a splay distortion when no voltage is applied, said method comprising the step of:
   applying to the liquid crystal during a display operation a voltage not less than a threshold voltage at which molecules of the liquid crystal begin to move under an influence of an applied electric field.

* * * * *